United States Patent
Cho

(10) Patent No.: US 11,030,022 B2
(45) Date of Patent: Jun. 8, 2021

(54) SYSTEM AND METHOD FOR CREATING AND MANAGING AN INTERACTIVE NETWORK OF APPLICATIONS

(71) Applicant: CIMPLRX CO., LTD., Seoul (KR)

(72) Inventor: Sung Jin Cho, North Wales, PA (US)

(73) Assignee: CIMPLRX CO., LTD., Seoul (KR)

( * ) Notice: Subject to any disclaimer, the term of this patent is extended or adjusted under 35 U.S.C. 154(b) by 0 days.

(21) Appl. No.: 16/830,004

(22) Filed: Mar. 25, 2020

(65) Prior Publication Data

US 2020/0226006 A1 Jul. 16, 2020

Related U.S. Application Data

(63) Continuation of application No. 15/815,608, filed on Nov. 16, 2017, now Pat. No. 10,635,509.

(60) Provisional application No. 62/423,746, filed on Nov. 17, 2016.

(51) Int. Cl.
| | |
|---|---|
| *G06F 15/16* | (2006.01) |
| *G06F 9/54* | (2006.01) |
| *H04L 29/08* | (2006.01) |
| *H04L 29/06* | (2006.01) |

(52) U.S. Cl.
CPC ............. *G06F 9/543* (2013.01); *G06F 9/54* (2013.01); *H04L 65/1069* (2013.01); *H04L 65/4007* (2013.01); *H04L 67/02* (2013.01); *H04L 67/125* (2013.01); *H04L 67/36* (2013.01)

(58) Field of Classification Search
CPC ....... G06F 9/543; G06F 9/54; H04L 65/1069; H04L 65/4007; H04L 67/02; H04L 67/125; H04L 67/36

USPC .......................................................... 709/205
See application file for complete search history.

(56) References Cited

U.S. PATENT DOCUMENTS

| | | |
|---|---|---|
| 7,400,322 B1 | 7/2008 | Urbach |
| 7,401,131 B2 | 7/2008 | Robertson |
| 7,676,539 B2 | 3/2010 | Jhoney |
| 7,933,952 B2 | 4/2011 | Parker |
| 7,937,655 B2 | 5/2011 | Teng |
| 8,266,214 B2 | 9/2012 | Hon |
| 8,463,852 B2 | 6/2013 | Sposetti |
| 8,694,953 B2 | 4/2014 | Khodabandehloo |
| 9,118,723 B1 | 8/2015 | Su |
| 9,152,936 B2 | 10/2015 | Pearson |

(Continued)

OTHER PUBLICATIONS

Adai et al., "LGL: Creating a Map of Protein Function with an Algorithm for Visualizing Very Large Biological Networks," J. Mol. Biol., 340: 179-190, 2004.

(Continued)

*Primary Examiner* — Melvin H Pollack
(74) *Attorney, Agent, or Firm* — Ladas & Parry, LLP

(57) ABSTRACT

A method of creating an interactive application network includes displaying, by a processor, a workspace and a toolbox on a display screen, instantiating, by the processor, a first interaction container to display a first output in response to a first user input, instantiating, by the processor, a second interaction container to display a second output based on the first output, in response to a second user input, the second user input being a user interaction with the first interactive container, and linking, by the processor, the first interactive container with the second interactive container via an interactive link to form the interactive application network.

20 Claims, 15 Drawing Sheets

(56) References Cited

U.S. PATENT DOCUMENTS

| | | | |
|---|---|---|---|
| 9,282,145 B2 | 3/2016 | Wei | |
| 9,461,876 B2* | 10/2016 | Van Dusen | G06N 5/02 |
| 9,659,313 B2 | 5/2017 | Tsai | |
| 9,800,679 B2* | 10/2017 | Hein | G06Q 10/10 |
| 9,940,014 B2* | 4/2018 | Tijssen | G06F 3/0482 |
| 9,942,177 B1* | 4/2018 | Ryabov | H04L 67/26 |
| 9,952,934 B2 | 4/2018 | Sinha | |
| 10,049,663 B2* | 8/2018 | Orr | G10L 25/84 |
| 10,084,650 B2* | 9/2018 | Kristjansson | H04L 41/22 |
| 10,110,505 B2* | 10/2018 | Smith | H04L 67/10 |
| 10,120,877 B2* | 11/2018 | Heath | G06F 16/29 |
| 10,241,644 B2 | 3/2019 | Gruber | |
| 10,291,465 B2 | 5/2019 | Rjeili | |
| 10,297,253 B2 | 5/2019 | Walker, II | |
| 10,304,314 B2* | 5/2019 | Fateh | G16H 40/63 |
| 10,318,871 B2 | 6/2019 | Cheyer | |
| 10,324,983 B2 | 6/2019 | Leeman-Munk | |
| 10,353,534 B2* | 7/2019 | Grammatikakis | G06F 9/451 |
| 10,366,158 B2* | 7/2019 | Bellegarda | G06N 5/022 |
| 10,373,279 B2* | 8/2019 | Zaslavsky | G09B 7/00 |
| 10,410,604 B2* | 9/2019 | Greco | G06F 16/9577 |
| 10,424,000 B2* | 9/2019 | Chow | G06Q 30/0625 |
| 10,521,466 B2* | 12/2019 | Bellegarda | G06F 16/335 |
| 10,616,079 B2* | 4/2020 | Layman | G06Q 10/06316 |
| 10,659,851 B2* | 5/2020 | Lister | H04N 21/2387 |
| 10,698,628 B2* | 6/2020 | Frank | G06F 3/0613 |
| 10,831,981 B2* | 11/2020 | Rajwat | G06F 40/186 |
| 10,904,270 B2* | 1/2021 | Muddu | G06F 3/04842 |
| 2007/0282951 A1 | 12/2007 | Selimis | |
| 2009/0216775 A1 | 8/2009 | Ratliff | |
| 2012/0030289 A1 | 2/2012 | Buford | |
| 2013/0212507 A1 | 8/2013 | Fedoseyeva | |
| 2017/0168690 A1 | 6/2017 | Kirk | |
| 2018/0167686 A1 | 6/2018 | James | |
| 2018/0278462 A1 | 9/2018 | Bjontegard | |
| 2019/0041845 A1 | 2/2019 | Cella | |

OTHER PUBLICATIONS

Adams et al., "From Data to Knowledge: Chemical Data Management, Data Mining, and Modeling in Polymer Science," J. Comb. Chem., 6:12-23, 2004.

Agrafiotis et al., "Advanced Biological and Chemical Discovery (ABCD): Centralizing Discovery Knowledge in an Inherently Decentralized World," J. Chem. Inf. Model., 47:1999-2014, 2007.

Ahlberg, "Visual exploration of HTS databases: bridging the gap between chemistry and biology," DDT, 4(8): 370-376, Aug. 1999.

Apweiler et al., "UniProt: the Universal Protein knowledgebase," Nucleic Acids Resarch, 32: D115-D119, 2004.

Bento et al., "The ChEMBL bioactivity database: an update," Nucleic Acids Reasearch, 42: D1083-D1090, 2014.

Berman et al., "The Protein Data Bank," Nucleic Acids Research, 28(1): 235-242, 2000.

Berthold et al., "KNIME—The Konstanz Information Miner," SIGKDD Explorations, 11(1): 26-31, 2008.

Broad Institute, "FIREBROWSE," Tutorial, 40 pages, Apr. 17, 2016.

Chambers et al., "UniChem: a unified chemical structure cross-referencing and identifier tracking system," Journal of Cheminformatics, 5(3): 1-9, 2013.

Chen et al., "Leveraging Big Data to Transform Target Selection and Drug Discovery," Clinical Pharmacology & Therapeutics, 99(3): 285-297, Mar. 2016.

Cho et al., "ADAAPT: Amgen's data access, analysis, and prediction tools," J. Comput. Aided Mol. Des., 20:249-261, 2006.

Cho, "PRE-render Content Using Tiles (PRECUT). 1. Large-Scale Compound-Target Relationships Analyses," CimplSoft, Thousand Oaks, 29 pages.

Clark et al., "The Cancer Imaging Archine (TCIA): Maintaining and Operating a Public Information Repository," J. Digit. Imaging, 26: 1045-1057, 2013.

Dassault Systemes BIOVIA, BIOVIA Workbook, Release 2017, 4 pages.

De Souza et al., "An overview of the challenges in designing, integrating, and delivering Bark: a public chemical biology resource and query portal across multiple organizations, locations, and disciplines," J. Biomol. Screen., 19(5): 614-627, Jun. 2014.

Deng et al., "ImageNet: A Large-Scale Hierarchical Image Database," Dept. of Computer Science, Princeton University, USA, 8 pages, 2009.

Ertl et al., "Web-based cheminformatics tools deployed via corporate Intranets," DDT: Biosilico, 2(5): 201-207, Sep. 2004.

Gaulton et al., "ChEMBL: a large-scale bioactivity database for drug discovery," Nucleic Acids Research, 40: D1100-D1107, 2012.

Gobbi et al., "Process-Driven Information Management System at a Biotech Company: Concept and Implementation," J. Chem. Inf. Comput. Sci., 44:964-975, 2004.

Hagadone et al., "Integrating Chemical Structures into an Extended Relational Database System," W.A. Warr (Ed.), Chemical Structures 2, 1993, 2 pages.

https://www.dotmatics.com/sites/default/files/literature/datasheets/vortex-a4.pdf, 2 pages.

Ihlenfeldt et al., "Enhanced CACTVS Browser of the Open NCI Database," J. Chem. Inf. Comput. Sci., 42:46-57, 2002.

Landrum, "RDKit Documentation," 125 pages, Oct. 8, 2017.

Langmead et al., "Ultrafast and memory-efficient alignment of short DNA sequences to the human genome," Genome Biology, 10(3): R25-R25.10, 2009.

LeCun et al., "Deep learning," Nature, 521:436-444, May 28, 2015.

Mak et al., "Metrabase: a cheminformatics and bioinformatics database for small molecule transporter data analysis and (Q)SAR modeling," J. Cheminform., 7:31, 12 pages, 2015.

Mamoshina et al., "Applications of Deep Learning in Biomedicine," Mol. Pharmaceutics, 13:1445-1454, 2016.

Manning et al., "The Protein Kinase Complement of the Human Genome," Science, 298: 1912-1934, Dec. 6, 2002.

Mudunuri et al., "bioDBnet: the biological database network," Bioinformatics, 25(4): 555-556, 2009.

Muresan et al., "Making every SAR point count: the development of Chemistry Connect for the large-scale integration of structure and bioactivity data," Drug Discovery Today, 16(23/24): 1019-1030, Dec. 2011.

O'Boyle et al., "Open Babel: An open chemical toolbox," Journal of Cheminformatics, 3(33): 1-14, 2011.

Papadatos et al., "SureChEMBL: a large-scale, chemically annotated patent document database," Nucleic Acids Research, 44: D1220-D1228, 2016.

Pavlov et al., "Indigo: Universal Cheminformatics API," Open-source software, 11 pages, Nov. 7, 2010.

Pereira et al., "Boosting Docking-Based Virtual Screening with Deep Learning," J. Chem. Inf. Model., 56:2495-2506, 2016.

Rauschenbach, "Progressive Image Transmission Using Levels of Detail and Regions of Interest," IASTED Conf. on Computer Graphics and Imaging, 4 pages, Jun. 1998.

Ristić, "OPENSSL Cookbook," Second Edition, 101 pages, 2017.

Rojnuckarin et al., "ArQiologist: An Integrated Decision Support Tool for Lean Optimization," J. Chem. Inf. Model., 45:2-9, 2005.

Sander et al., "OSIRIS, an Entirely in-House Developed Drug Discovery Informatics System," J. Chem. Inf. Model., 49:232-246, 2009.

Shannon et al., "Cytoscape: A Software Environment for Integrated Models of Biomolecular Interaction Networks," Genome Research, 7 pages, 2003.

Shtatland et al., "PepBank—a database of peptides based on sequence text mining and public peptide data sources," BMC Bioinformatics, 8: 280-290, 2007.

Silver et al., "Mastering the game of Go with deep neutral networks and tree search," Nature, vol. 529, 20 pages, Jan. 28, 2016.

Stark et al., "BioGRID: a general repository for interaction datasets," Nucleic Acids Research, 34: D535-539, 2006.

Sterling et al., "ZINC 15—Ligand Discovery for Everyone," J. Chem. Inf. Model., 55: 2324-2337, 2015.

(56) References Cited

OTHER PUBLICATIONS

Subramanian, "Library of Integrated Network Based Cellular Signatures (LINCS)," NIEHS Workshop, Broad Institute, 26 pages, Jun. 26, 2013.

Trepalin et al., "CheD: Chemical Database Compilation Tool, Internet Server, and Client for SQL Servers," J. Chem Inf. Comput. Sci., 41:100-107, 2001.

Wallach et al., "Atom Net: A Deep Convolutional Neural Network for Bioactivity Prediction in Structure-based Drug Discovery," arXiv:1510.02855v1, 11 pages, Oct. 10, 2015.

Williams et al., "Open PHACTS: semantic interoperability for drug discovery," Drug Discovery Today, 17(21/22): 1188-1198, Nov. 2012.

Wu et al., "MoleculeNet: A Benchmark for Molecular Machine Learning," arXiv:1703.00564v2, 61 pages, Oct. 11, 2017.

\* cited by examiner

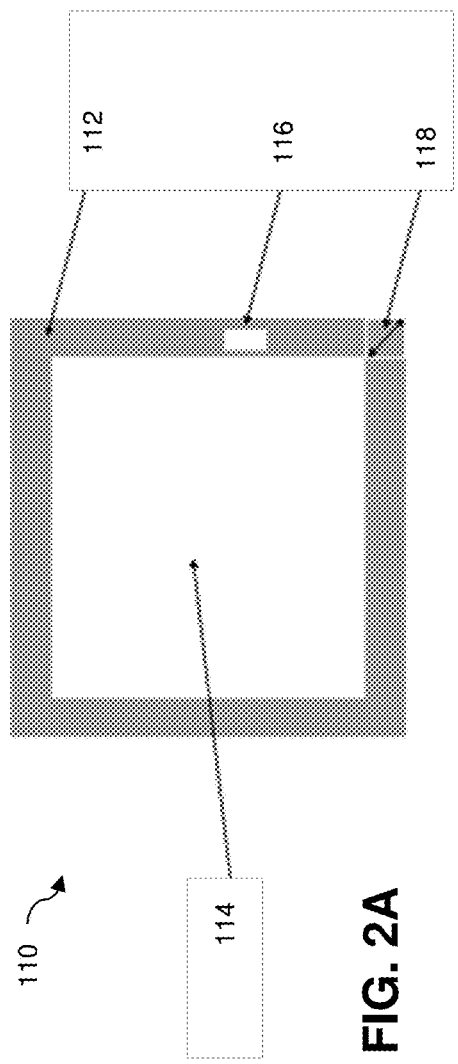
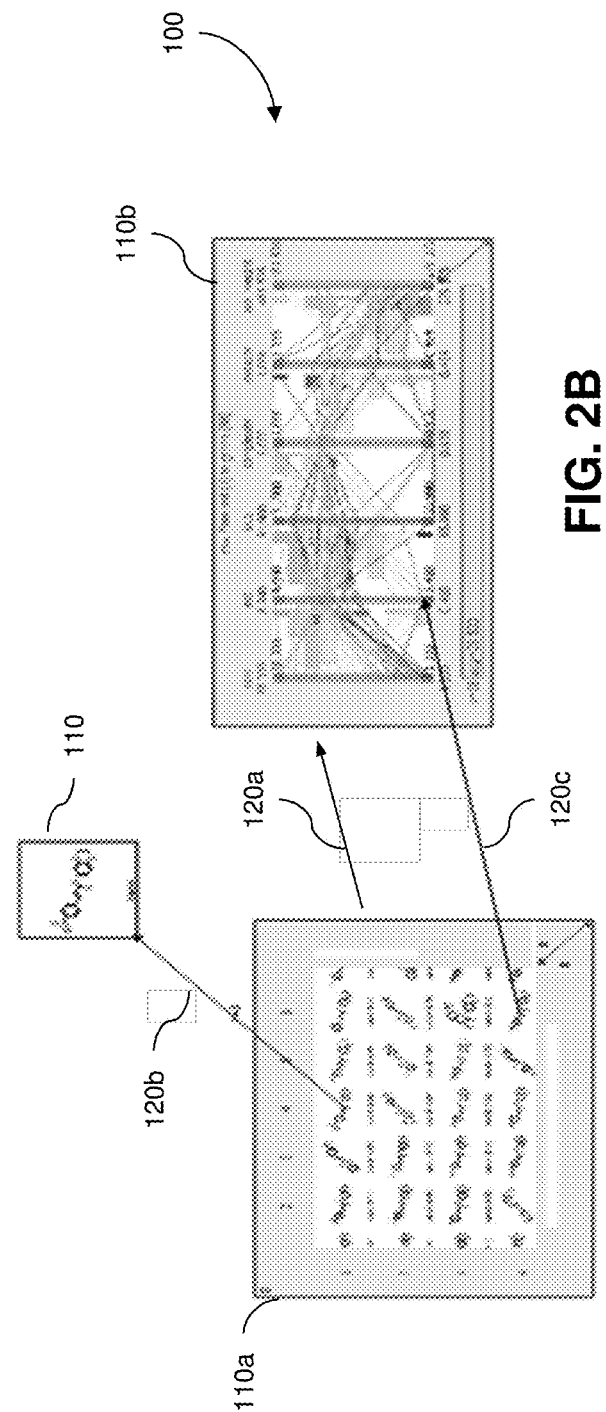

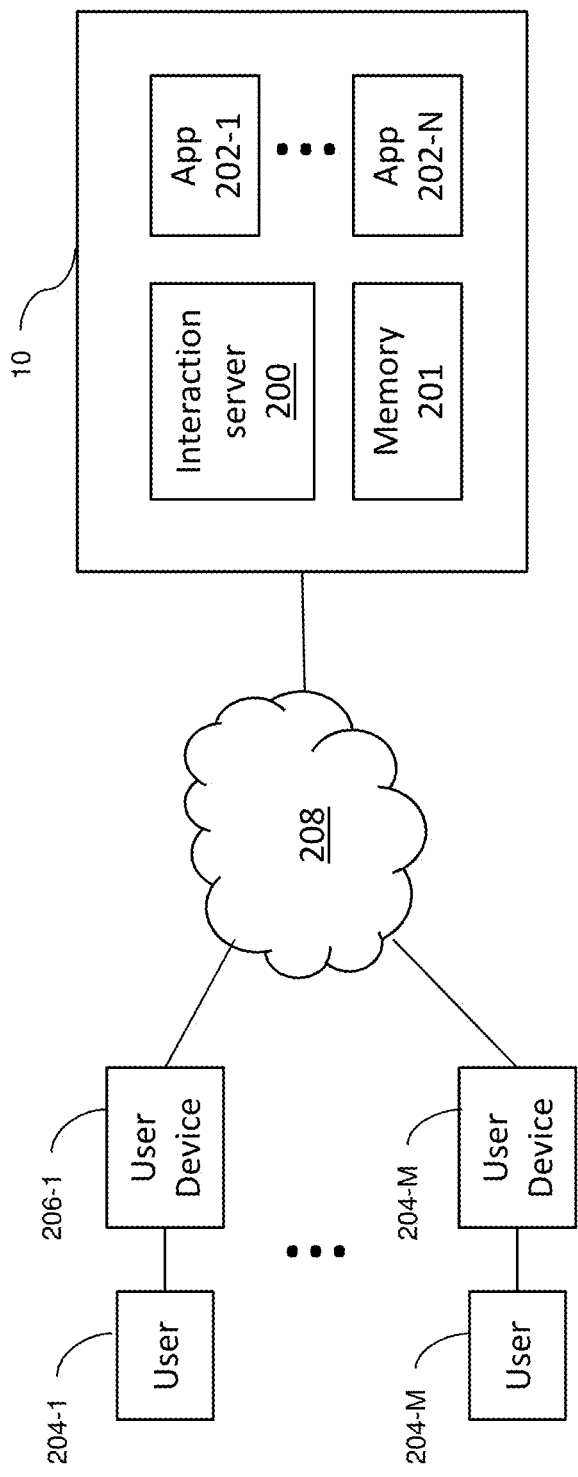

SYSTEM AND METHOD FOR CREATING AND MANAGING AN INTERACTIVE NETWORK OF APPLICATIONS

CROSS-REFERENCE TO RELATED APPLICATION(S)

This application is a continuation of U.S. patent application Ser. No. 15/815,608 filed Nov. 16, 2018, which claims priority to, and the benefit of, U.S. Provisional Application No. 62/423,746 ("Method and System to Create and Manage Connected Applications Software in order to Capture User's Insight and Experience"), filed on Nov. 17, 2016, the contents of all of which are incorporated herein by reference.

FIELD

Aspects of the invention relate to the field of information analysis and information sharing between users.

BACKGROUND

The insight and experience gained by a researcher are often lost because the current productive and analytics software are inherently data-centric, disconnected, and scattered.

Generally, large-scale research efforts, such as drug discovery, are complicated, capital-intensive, and lengthy processes that often involve expertise from multiple scientific disciplines. Because such efforts are multidisciplinary in nature, data sets generated and used by researchers are often as diverse as the fields they are in. In addition, advances in instrumentation and information technology have led to an unprecedented availability of scientific data and metadata that are complex and highly interconnected.

Common characteristics found among research tools are that they are inherently data-centric, disconnected, and scattered. For example, performing a routine medicinal chemistry task of performing similarity and substructure searches, followed by looking for pharmacology and protein structure data, often requires juggling multiple tools and resources. Saving the search results is tedious, and often the entire process needs to be repeated multiple times using different starting or substructures to explore design hypotheses. Remarkably, despite the obvious inconvenience frequently experienced by researchers, there are no tools to address this balancing act of exploring hypotheses and keeping track of what has been done. The insight and experience gained by researchers are often found in their activity history, which is valuable information not utilized fully by the current productive and analytics software.

The above information disclosed in this Background section is only for enhancement of understanding of the background of the invention, and therefore it may contain information that does not form the prior art that is already known to a person of ordinary skill in the art.

SUMMARY

Aspects of embodiments of the invention are directed to a system and method for creating and managing an interaction system that captures the insight and experience of one or more users in a single visual environment or tool. According to some embodiment, the interaction system tracks the insight and experience of the user(s) by utilizing an interactive application network that includes connected interactive containers acting as portals of one or more applications and interactive links that establish the relationship between the interactive containers, which are generated as the user(s) perform a series of tasks within the interaction system to achieve a desired goal. In some embodiments, the interaction system allows users to visualize and share their work history, thus facilitating collaboration among users and leading to increased productivity and reduced research time and cost.

According to some embodiments of the invention, there is provided a method of creating an interactive application network, the method including: displaying, by a processor, a workspace and a toolbox on a display screen; instantiating, by the processor, a first interaction container to display a first output in response to a first user input; instantiating, by the processor, a second interaction container to display a second output based on the first output, in response to a second user input, the second user input being a user interaction with the first interactive container; and linking, by the processor, the first interactive container with the second interactive container via an interactive link to form the interactive application network.

In some embodiments, instantiating the first interactive container includes: generating, by the processor, the first interactive container in response to the first user input; executing, by the processor, a first application associated with the first interactive container to generate the first output; and displaying, by the processor, the first output in a viewport of the first interactive container.

In some embodiments, the first user input is a user selection of a task from the toolbox or an import of data from an external application.

In some embodiments, instantiating the second interactive container includes: generating, by the processor, the second interactive container in response to the second user input; executing, by the processor, a second application associated with the second interactive container to generate the second output; and displaying, by the processor, the second output in a viewport of the second interactive container.

In some embodiments, instantiating the second interactive container further includes: extracting, by the processor, data from the first interactive container based on the second user input; and inputting, by the processor, first data into the second application associated with the second interaction container.

In some embodiments, the second user input is a user interaction with the first output of the first interactive container or a selection of a task or an application from a selection menu associated with the first interactive container.

In some embodiments, the first output of the first interactive container includes a plurality of elements, and the second user input is a selection of a task or an application from a selection menu associated with an element from among the plurality of elements.

In some embodiments, the linking the first and second interactive containers includes: generating, by the processor, contextual data identifying the first interactive container as a parent of the second interactive container, and identifying the second interactive container as a child of the first interactive container; and displaying, by the processor, the interactive link on the workspace as an arrow pointing from the first interactive container to the second interactive container.

In some embodiments, the displaying the interactive link includes displaying, by the processor, the arrow on the workspace pointing from a first element of the first output of the first interactive container to the second interactive container or to a second element of the second output of the second interactive container.

In some embodiments, a first application associated with the first interactive container and a second application associated with the second interactive container include one or more of a word processor, a web browser, a spreadsheet, a communication software, an image/video viewer, an image/video editor, and a 3D visualizer.

In some embodiments, the method further includes: suspending, by the processor, an application associated with an inactive container from among the first and second interactive containers; maintaining, by the processor, active an application associated with an active container from among the first and second interactive containers; displaying, by the processor, an image, in a viewport of the inactive container, corresponding to a last live output of the inactive container; and displaying, by the processor, a live output in a viewport of the active container.

In some embodiments, the interactive application network is configured to record and visually display a workflow of a user.

According to some embodiments of the invention, there is provided an interaction system for creating and managing an interactive application network, the interaction system including: a processor; and a memory storing instructions that, when executed on the processor, cause the processor to perform: displaying a workspace and a toolbox on a graphical display; instantiating a first interaction container to display a first output in response to a first user input; instantiating a second interaction container to display a second output based on the first output, in response to a second user input, the second user input being a user interaction with the first interactive container; and linking the first interactive container with the second interactive container via an interactive link to form the interactive application network.

In some embodiments, instantiating the first interactive container includes: generating the first interactive container in response to the first user input; executing a first application associated with the first interactive container to generate the first output; and displaying the first output in a viewport of the first interactive container.

In some embodiments, instantiating the second interactive container includes: generating the second interactive container in response to the second user input; executing a second application associated with the second interactive container to generate the second output; and displaying the second output in a viewport of the second interactive container.

In some embodiments, instantiating the second interactive container further includes: extracting data from the first interactive container based on the second user input; and inputting first data into the second application associated with the second interaction container.

In some embodiments, the second user input is a user interaction with the first output of the first interactive container or a selection of a task or an application from a selection menu associated with the first interactive container.

In some embodiments, the first output of the first interactive container includes a plurality of elements, and the second user input is a selection of a task or an application from a selection menu associated with an element from among the plurality of elements.

In some embodiments, the linking the first and second interactive containers includes: generating contextual data identifying the first interactive container as a parent of the second interactive container, and identifying the second interactive container as a child of the first interactive container; and displaying the interactive link on the workspace as an arrow pointing from the first interactive container to the second interactive container.

In some embodiments, the interaction system further includes: suspending an application associated with an inactive container from among the first and second interactive containers; maintaining active an application associated with an active container from among the first and second interactive containers; displaying an image, in a viewport of the inactive container, corresponding to a last live output of the inactive container; and displaying a live output in a viewport of the active container

BRIEF DESCRIPTION OF THE DRAWINGS

The accompanying drawings, together with the specification, illustrate example embodiments of the invention, and, together with the description, serve to explain the principles of the invention.

FIG. 2A illustrates a container of an interactive network supported by the interaction system, according to some exemplary embodiments of the present invention.

FIG. 2B illustrates different interactive links establishing relationships between containers and elements thereof, according to some exemplary embodiments of the present invention.

FIG. 5 is a block diagram illustrating various components of the interaction system, according to some exemplary embodiments of the present invention.

DETAILED DESCRIPTION

Figure 1:
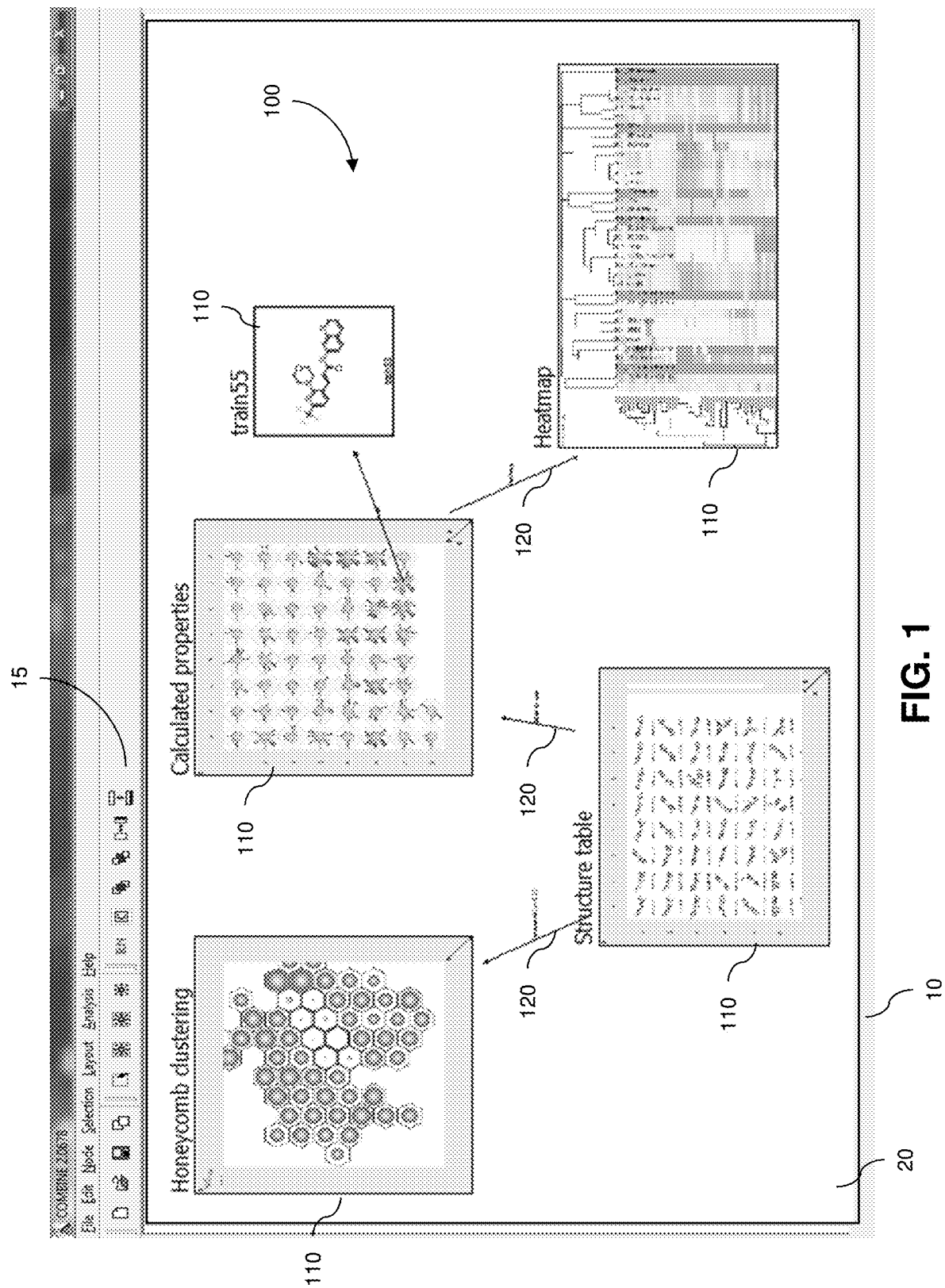
FIG. 1 illustrates an interaction system according to some exemplary embodiments of the present invention.

In the following detailed description, only certain exemplary embodiments of the invention are shown and described, by way of illustration. As those skilled in the art would recognize, the invention may be embodied in many different forms and should not be construed as being limited to the embodiments set forth herein. Descriptions of features or aspects within each exemplary embodiment should typically be considered as available for other similar features or aspects in other exemplary embodiments. Like reference numerals designate like elements throughout the specification.

In general terms, embodiments of the invention are directed to a system and method for creating and managing an interaction system (or an interactive workflow system) that captures the insight and experience of one or more users in a single visual environment. The insight and experience of the user(s) are tracked using an interactive application network (or an "interactive network") including linked (e.g., connected) interactive containers acting as portals of one or more applications and interactive links establishing the relationship between the interactive containers, which are generated as the user(s) perform a series of tasks within the interaction system to achieve a desired goal.

FIG. 1 illustrates an interaction system 10 according to some exemplary embodiments of the present invention.

Referring to FIG. 1, the interaction system 10 provides a toolbox 15 and a workspace (e.g., a canvas) 20 within which the interactive network 100 is created and managed. The workspace 20 along with the toolbox 15 may together provide a graphical user interface tool for generating, visualizing, and managing the interactive network 100. The interaction system 10 may include an operating system, a web browser, an application, and/or a virtual or augmented reality application (whereby the workspace 20 and the interactive network are presented in a virtual or augmented world). The interaction system 10 also allows a user to save an interactive network 100 or load an existing network into the workspace 20. A user may freely create, delete, and manipulate (e.g., move or modify) containers 110 and links 120 within the workspace 20. According to some embodiments, each container 110 within the interactive network 100 may provide an interactive visualization of an associated application. The interactive links 120 establish and indicate relationships between the interactive containers 110 of the network 100.

According to some embodiments, the interactive containers 110 and links 120 may provide user with a visual understanding of relationships between data and activities and quickly inform users which direction in an interactive network 100 leads to achieving a desired goal faster. In other words, the interactive network 100 may show which processes worked and which processes did not work or were inefficient. Interactive links 120 may also be used as a communication mechanism among containers 110 to share data or to control connected containers 110 to perform a task or a series of tasks.

According to some embodiments, when in multi-user mode, the interaction system 10 allows for the information stored in an interactive network 100 to be shared with other users if desired. In multi-user mode, the interactive network 100 may be dynamically created (e.g., in real time) by a plurality of users who interact with different containers 110 within the same network 100, and communicate and share information with one another via built-in communication or chat containers.

FIG. 2A is a more detailed schematic diagram of the container 110 according to some exemplary embodiments of the present invention. FIG. 2B illustrates different interactive links establishing relationships between containers 110 and elements thereof, according to some exemplary embodiments of the present invention.

Referring to FIG. 2A, in some examples, a container 110 may include a frame 112, a viewport 114 within the frame 112 that includes the user interface or output from an application associated with the container 110, which a user may interact with. The application associated with the container 110 may be a word processor, a web browser, a spreadsheet, a communication software (e.g., video or chat software), an image/video viewer, an image/video editor, a 3D visualizer, and/or the like. The application and associated functionality that is provided by each container 110 may be the same or different. For example, the application run by a first container to display and interact with its data may be different from an application run by a second container to display and interact with data of the second container. The disparate applications are provided by the single interaction system/tool 10, avoiding inefficiencies and costs in having to switch from one tool to another. In some embodiments, each container 110 has an associated data table and hash table, the data within which is utilized to generate an interactive visualization within the viewport 114 of the container 110. In some examples, the data table may organize data associated with the container 110 in rows and columns, which may be addressable using row and column identifiers, and the hash table may be an associative array containing key-value pairs corresponding to the data of the container 110 (e.g., a key may be "display type" and a value may be "image"). The container 110 may also include one or more scroll bars 116 that allow the user to scroll through the viewport 114, and a resize button 118 for resizing the frame 112 within the workspace 20 of the interaction system 10. A user may freely reposition the container within the workspace 20 by activating (e.g., by clicking on) and dragging the frame 112.

Referring to FIG. 2B, in some examples, an interactive link 120 may indicate a relationship between two containers 110 (see, e.g., link 120a), between an element (e.g., a data point) in an interactive container 110 and another interactive container 110 (see, e.g., interactive link 120b), or between an element in a container 110 and an element in another container 110 (see, e.g., interactive link 120c). A link 120 may be visually represented as a directional (e.g., a unidirectional or bidirectional) arrow, a line, a curve, or the like. When a linked element in a container 110 is outside of the viewport 114 of the container (i.e., not visible to a user), the interaction system may automatically adjust the visualization of the associated link 120 to point to the corresponding container 110 instead of the invisible element.

According to some examples, each link 120 may be added interactively either by simply double-clicking a container element specified by a mouse pointer, or by selecting one of the container's specific menus. The double-click action or selecting a menu option may also be used to instantiate an appropriate container 110, and this interaction-triggered instantiation may be one way that the interaction system tracks users' activities and allows users to focus on the current activity without losing the context. As shown in FIGS. 1 and 2, the interactive containers 110 and links 120 connecting them may be annotated to describe them further.

A link 120 may define a parent-child relationship between two containers 110, whereby the container 110 that is generated from another container 110 may be referred to as the child, and the originating container 110 may be referred to as the parent. For example, in FIG. 2B, container 110a may be the parent, and container 110b may be the child. A parent-child relationship may also be defined when linking two existing containers. For example, when a user draws a directional linking arrow from the first container 110a to the second container 110b, the interaction system 10 identifies the first container 110a as the parent, and the second container 110b as the child.

According to some embodiments, the interaction system 10 maintains contextual information for each container 110 and link 120, which may include information identifying connections or relationships between the containers 110. Such contextual information may include information about any parent (e.g., previous) container(s) and any child (e.g., subsequent) container(s), for each container 110, display parameters of each container (e.g., the position, size, zoom level, and label/annotation of each container), information about the visual element being displayed in viewport 114 of the container 110, and/or the like. When a new container 110/link 120 is added to the workspace 20, the interaction system 10 may update the contextual information for the new container 110/link 120 as well as any linked (e.g., connected) container 110/link 120. Such contextual information may be generated as discrete instructions or data files for each container 110 and link 120, and/or may be maintained as part of a master or overall instruction set corresponding to the entire interaction network.

As illustrated in FIGS. 1 and 2A-2B, in some examples, a container 110 may store and manipulate its associated data in tabular form, and the data found in each cell of the table may be of a diverse set of data types. The linked nature of the containers 110 alleviates the need for each container 110 to independently store and maintain its associated data. For example, rather than maintain its own data, it may be sufficient for a container 110 to keep track of its parent container, or the element in the parent container from which it originated, and to dynamically extract or derive (e.g., in real time) from the parent container and/or other external data sources, the information that is to be displayed in the viewport of the container 110. The external data sources may, for example, be databases accessible to the interaction system 10 (e.g., via web service).

Thus, the data associated with each container 110 of the interactive network 100 may be permanently and separately stored or dynamically retrieved (e.g., in real time) when a saved interactive network 100 is loaded. In examples in which data is dynamically retrieved, the interactive network 100 may include a list of URLs identifying how different data may be retrieved. A particular container may, for example, retrieve the image of the selected protein when it is loaded.

Referring to FIGS. 1 and 2A-2B, an interactive network 100 may be generated as users interact with each container 110, and links 120 identify how different activities represented by the containers 110 are connected. The spatial distribution of the containers 110 and their connection via the links 120 allow a user to visualize, for example, the workflow, or the history of how data was transformed and/or analyzed. However, beyond merely visualizing data, the containers of the various embodiments allow interaction with the data contained in the containers. The interaction may be the invoking of a function to only a portion of the data in a first container, to then display results of the function in a second container that is automatically generated as an output of the function. A separate function may then be invoked to the results displayed in the second container to automatically generate a third container. The series of functions that are invoked may relate to a workflow that is employed to accomplish a particular task, such as, analyzing pharmacological data, or the like. In performing such analysis, a first function may be to isolate and extract a particular compound. The result of such function may be to create a second container containing data pertaining to the extracted compound. A user may interact with the data in the second container to invoke a second function, such as, for example, performing a search of external databases of scientific papers mentioning the extracted compound. The results of the second function may be provided in a third container containing the search results. The search results may be displayed via an application such as, for example, a spreadsheet application that allows the manipulating of data via functions provided by the spreadsheet application.

According to some embodiments of the present invention, to conserve system resources (e.g., processing time and memory capacity), the interaction system 10 may suspend or stop applications associated with inactive containers 110, which may include containers that are outside of the user's view of the workspace 20 (i.e., not visible), containers that are visible but which display a low level of detail (e.g., are so small that a user can't see what it is displaying), and/or containers that are visible to the user but are not pointed to or selected by the user. The interaction system 10 may keep running or active the applications associated with active containers, which may include visible containers with a high level of detail that may be intelligible to a user. While the viewports of active containers 110 may display a live output of the associated active applications, the viewports of inactive (or deactivated) containers 110 may display an image that corresponds to the last live output of the now inactive container.

A few representative use cases illustrated in FIGS. 3A to 4D may help illustrate some of the embodiments of the present invention.

Figure 3A:
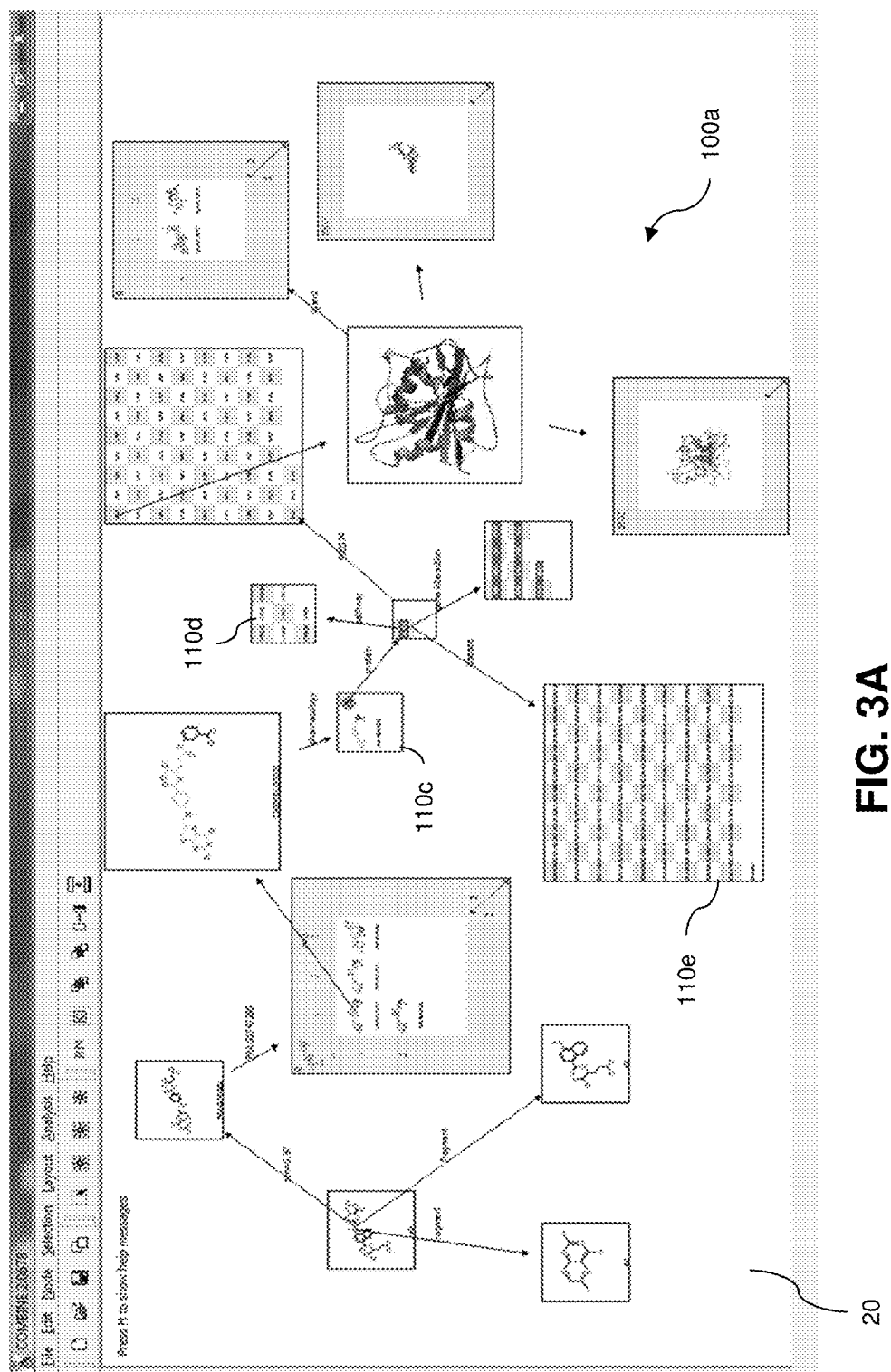
FIG. 3A is a photograph of a workspace of the interaction system illustrating the linking of chemical and pharmacological data in an interactive network, according to some exemplary embodiments of the present invention.
Figure 3B:
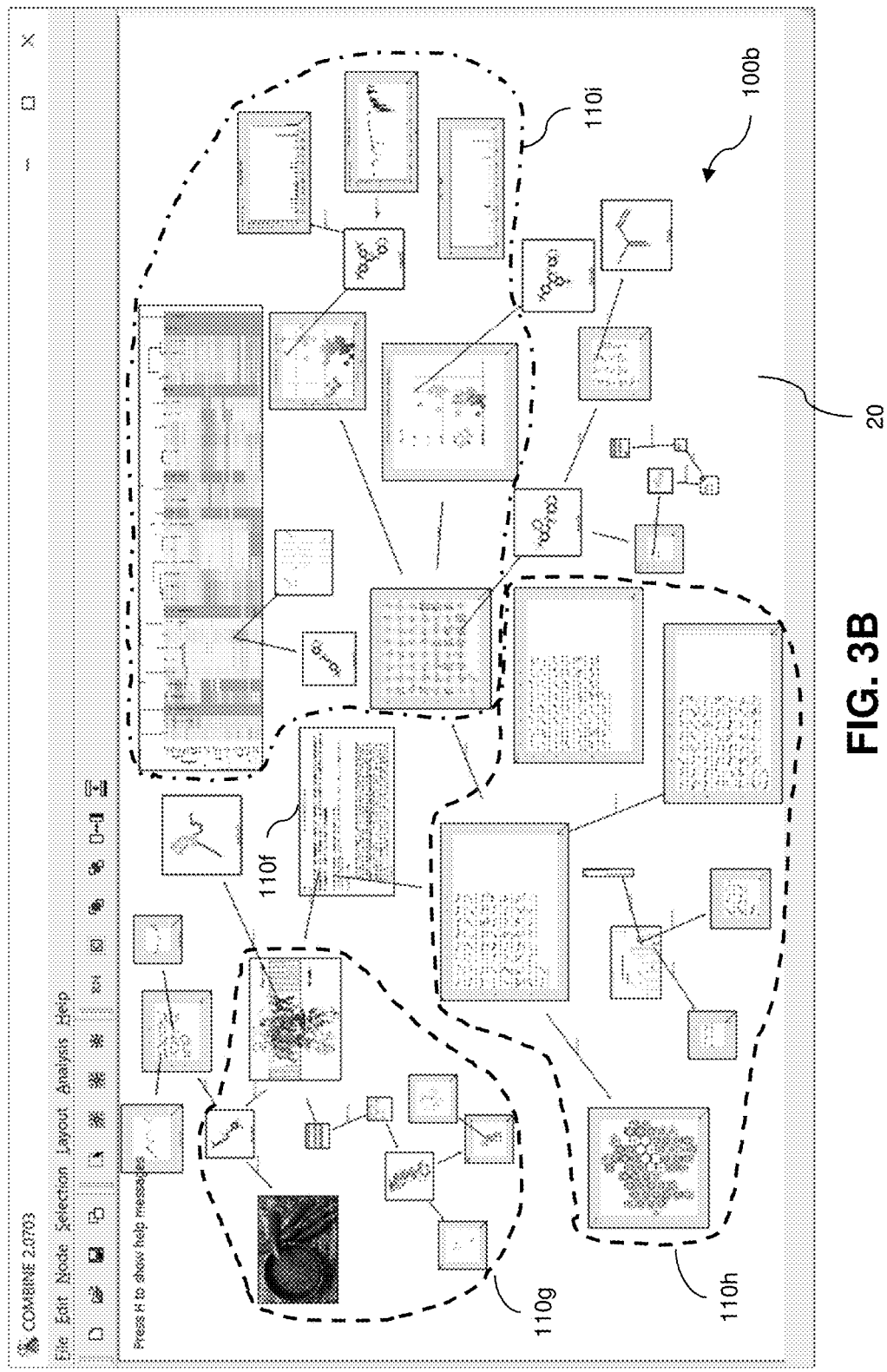
FIG. 3B is a photograph of a workspace illustrating a textual, analytical, and visual annotation of a scientific paper in an interactive network, according to some exemplary embodiments of the present invention.
Figure 3C:
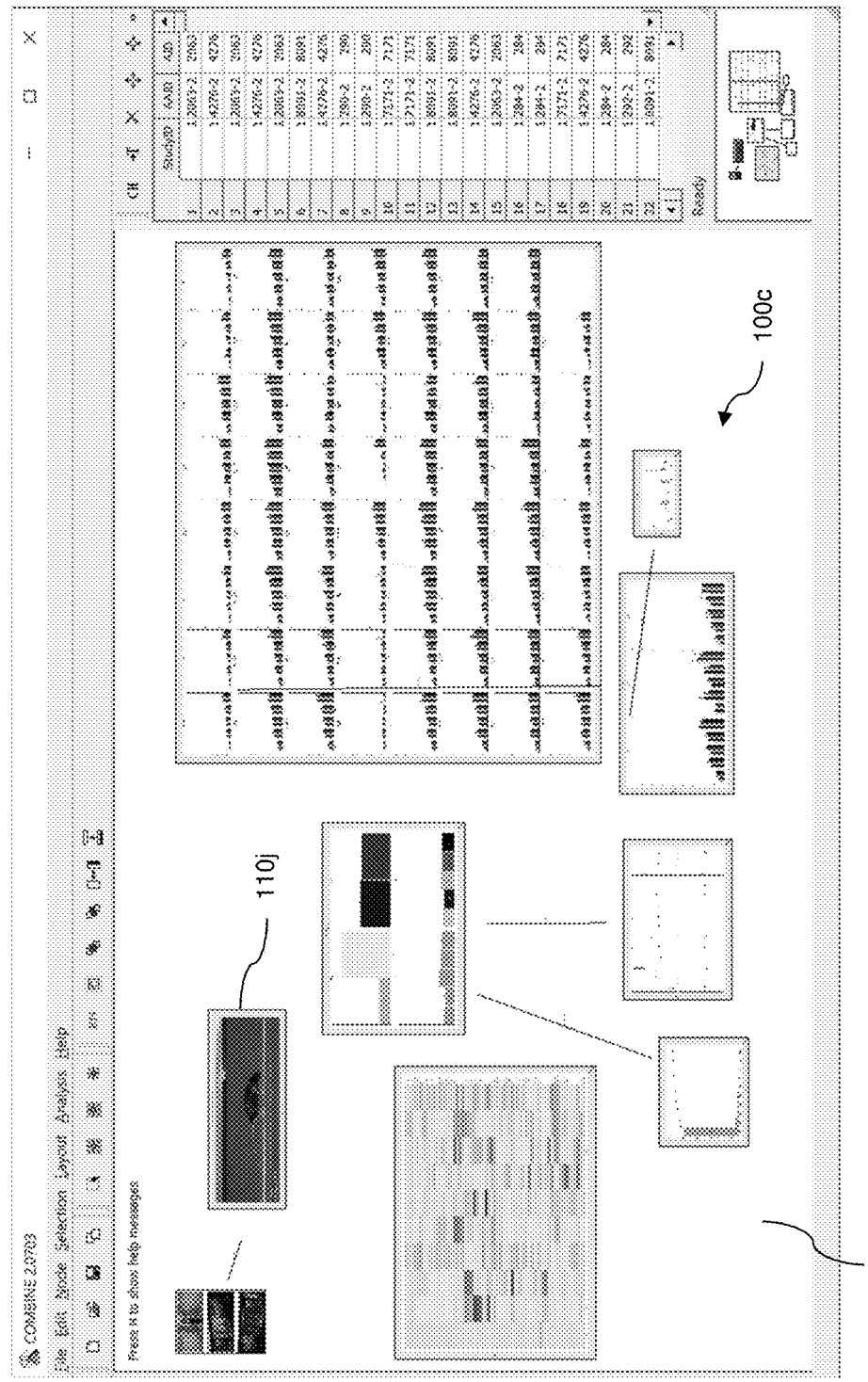
FIG. 3C is a photograph of the workspace illustrating the analysis of in vivo pharmacological data in an interactive network, according to some exemplary embodiments of the present invention.

FIGS. 3A-3C are photographs of the workspace 20 of the interaction system 10 illustrating data organization and data sharing in various interactive networks 100, according to some exemplary embodiments of the present invention. FIG. 3A is a photograph of the workspace 20 illustrating the linking of chemical and pharmacological data in the interactive network 100a, according to some exemplary embodiments of the present invention. FIG. 3B is a photograph of the workspace 20 illustrating a textual, analytical, and visual annotation of a scientific paper in the interactive network 100b, according to some exemplary embodiments of the present invention. FIG. 3C is a photograph of the workspace 20 illustrating the analysis of in vivo pharmacological data in the interactive network 100c, according to some exemplary embodiments of the present invention.

Referring to FIGS. 3A-3C, a workflow of medicinal chemists may involve finding compounds similar to the compound they are working on. Once a similar compound is found, researchers search for any associated pharmacology data. If a connection to a protein target can be made, other targets, pathways the targets are in, and diseases the targets are implicated in are all the information medicinal chemists are interested in knowing.

Based on literature hits, the medicinal chemist may perform the structure activity relationship analysis, design a new compound, and search against a patent database (e.g., as shown in FIGS. 3A and 3B). A biologist may look for other off-target activities of the designed compound and formulate novel therapeutic uses. For example, in FIG. 3A, container 110c displays interactive pharmacology data (e.g., invitro assay data and on-off target activities, if available), container 110d displays interactive pathway-related data, and container 110e displays interactive disease-related data. Further, in FIG. 3B, container 110f displays a medicinal chemistry paper, containers 110g display interactive biological data related to an element in the scientific paper of container 110f; containers 110h display interactive structure-activity relationship tables and analysis corresponding to an element in the scientific paper of container 110f; and containers 110i provide interactive data visualization of some of the data contained in containers 110h. An in vivo pharmacologist may link imaging data to correlate in vitro assay data or add a short video to show the behavior of an animal (e.g., as shown by container 110j in FIG. 3C).

One common activity most researchers perform is to read scientific papers and try to apply what they learn in their own research. Writing a research paper to describe positive findings is a typical result. However, negative findings and other exploratory activities are generally not captured properly. The interaction system 10 may allow users to capture these activities by linking datasets, performing analyses, and visualizing results. For example, FIG. 3B illustrates different user activities stemming from a medicinal chemistry paper. In FIG. 3B, target information is added to describe the biology of the capsaicin receptor, and the structure-activity relationship table is generated using compounds described in the paper. Annotating a research paper with a dataset which a user can interact with in real time is an extremely powerful way to understand and apply their findings.

Some conventional standalone or browser-enabled applications allow users to save the end result of a search or bookmark the relevant web pages. However, the process by which the users arrive at that position has to be described separately or, oftentimes, is lost. In contrast, the interaction system 10 captures this history automatically via the interactive network 100, so that users know exactly how they arrived at the end result. Additionally, the interaction system 10 allows users to easily share the history in a collaborative environment. Sharing the history promotes collaboration and improves productivity because seeing and understanding what has been done in the past enables users to reduce or minimize the chance of repeating the same work, and to plan future activities more efficiently.

Some of the operations of the interaction system 10 provided above are described in further detail with reference to FIGS. 4A-4D.

Figure 4A:
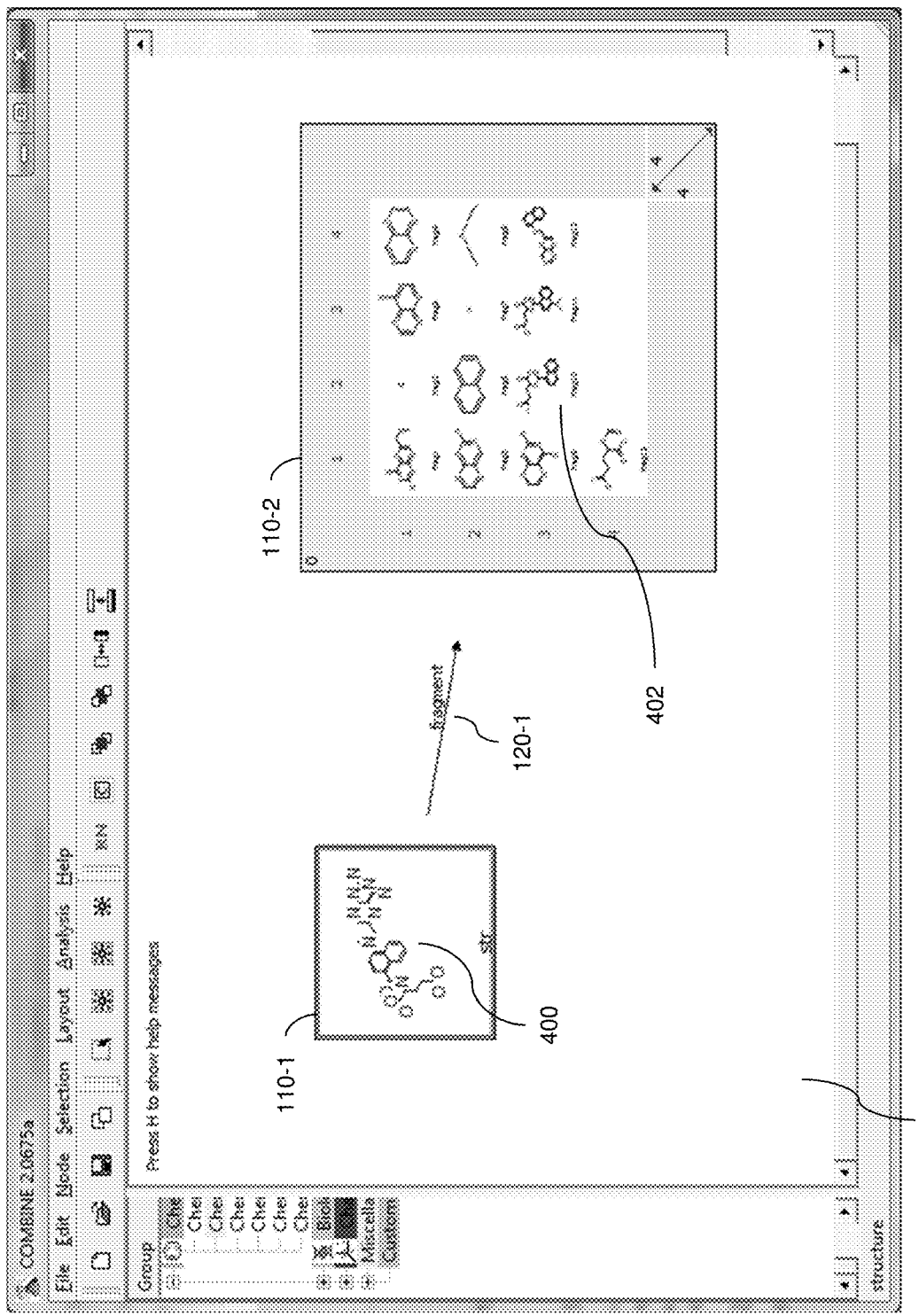
FIGS. 4A-4B are photographs of a workspace illustrating the breakup of a chemical compound into its constituent fragments, according to some exemplary embodiments of the present invention.
Figure 4B:
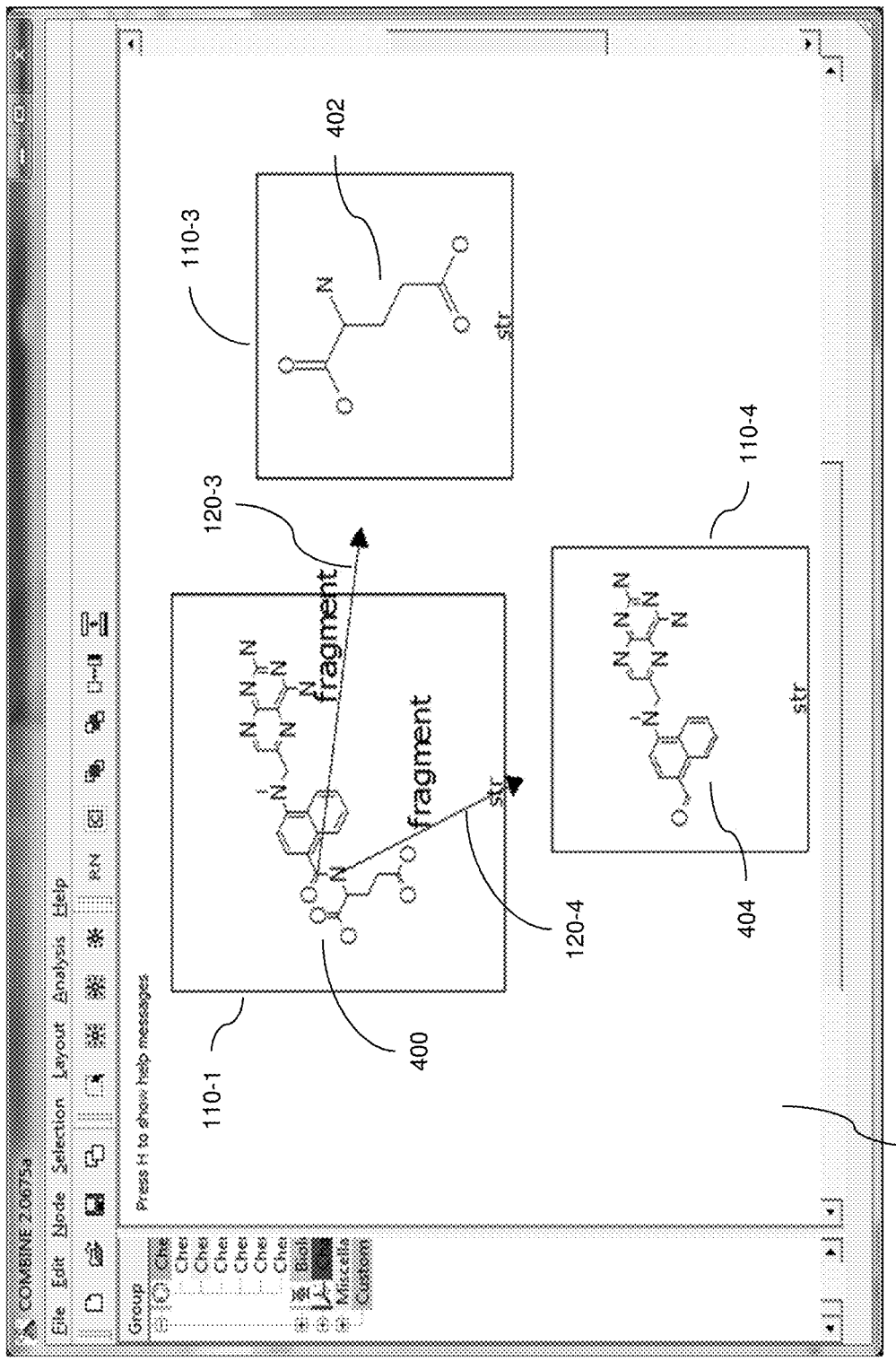

FIGS. 4A-4B are photographs of the workspace 20 illustrating the breakup of a chemical compound into its constituent fragments, according to some exemplary embodiments of the present invention.

As illustrated in FIG. 4A, in some examples, the interaction system 10 allows a user to import a chemical compound from another application into the workspace 20 (e.g., by copying and pasting the chemical compound). Upon import, the interaction system 10 may automatically instantiate (e.g., generate and display) a container 110-1 including the structure 400 of the imported compound. When a user interacts with the container 110-1 (by, e.g., double-clicking on the container 110-1), the system 10 may instantiate a container 110-2 including the individual fragments 402 of the compound in container 110-1. In so doing, the system 10 may invoke an application that is preassigned to the double-click action associated with the container type of container 110-1. The invoked application may extract and process the necessary information from the container 110-1 to generate the fragments 402 and to display them through the container 110-2. According to one embodiment, the application/program that is invoked to display and interact with information provided in container 110-1 is different from the application/program that is invoked to display and interact with information provided in container 110-2. For example, the first application may be a Word application, and the second application may be a spreadsheet application. The second application that is associated with container 110-2 may depend on the function that was invoked in container 110-1 that resulted in the generating of container 110-2. The types of interactions that may be offered for container 110-2 may also depend on the function that was invoked in container 110-1.

The interaction system 10 may also automatically link the containers 110-1 and 110-2 via the interactive link 120-1 and designate them as parent and child containers, respectively.

As illustrated in FIG. 4B, when a user double-clicks a bond within the structure 400, in a process similar to that above, the system 10 may split the structure 400 into two fragments 402 and 404 by breaking the double-clicked bond and instantiating two different containers 110-3 and 110-4 that include the fragments 402 and 404, respectively. Here, the operation performed by the interaction system 10 may be predefined as the action to take in response to receiving a user double-click event pertaining to a bond element within the container type of container 110-1. Here, the interaction system 10 may also automatically link the child containers 110-3 and 110-4 to the double-clicked bond in the parent container 110-1.

Figure 4C:
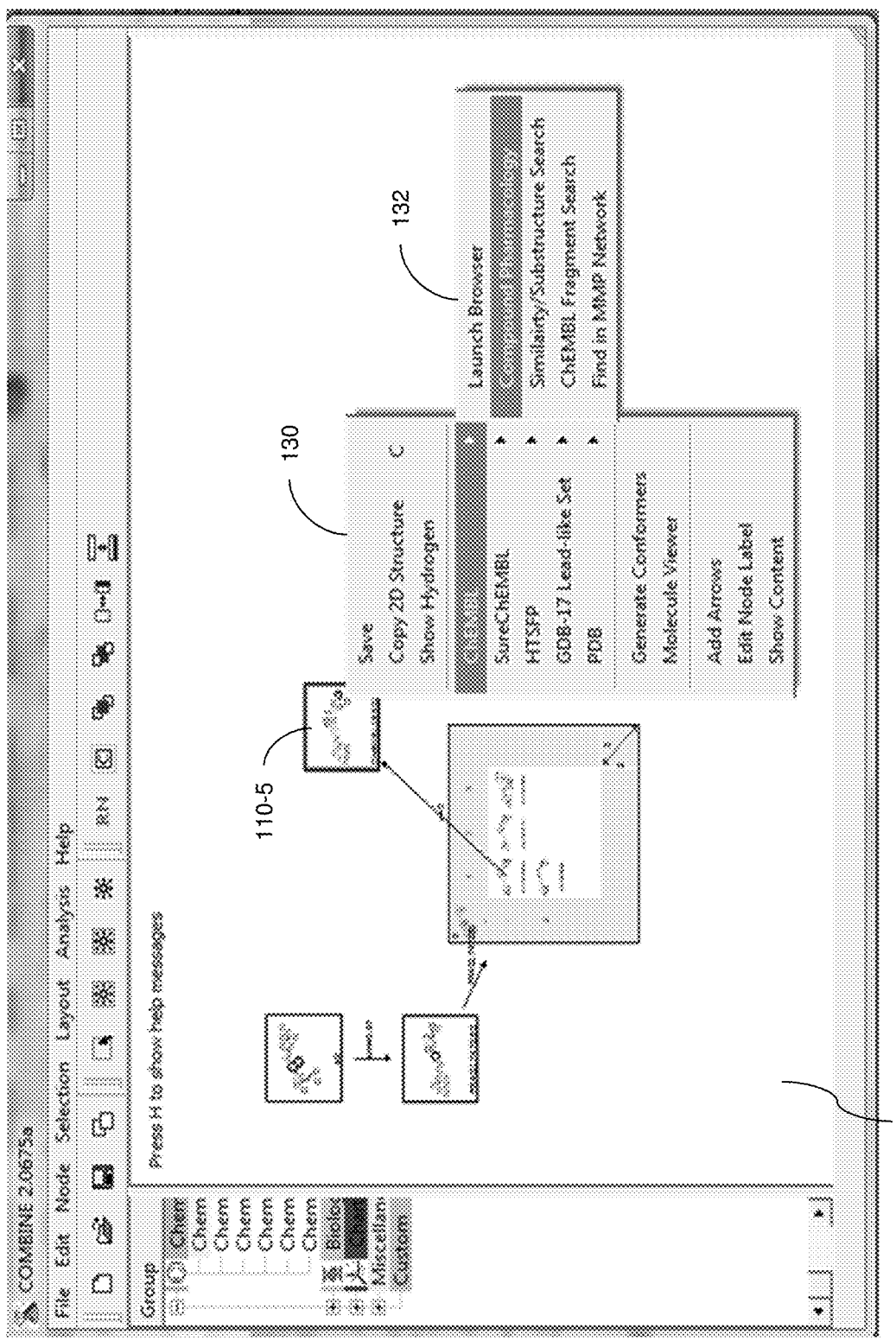
FIGS. 4C-4D are photographs of a workspace illustrating the workflow from a chemical compound to pharmacological data, according to some exemplary embodiments of the present invention.
Figure 4D:
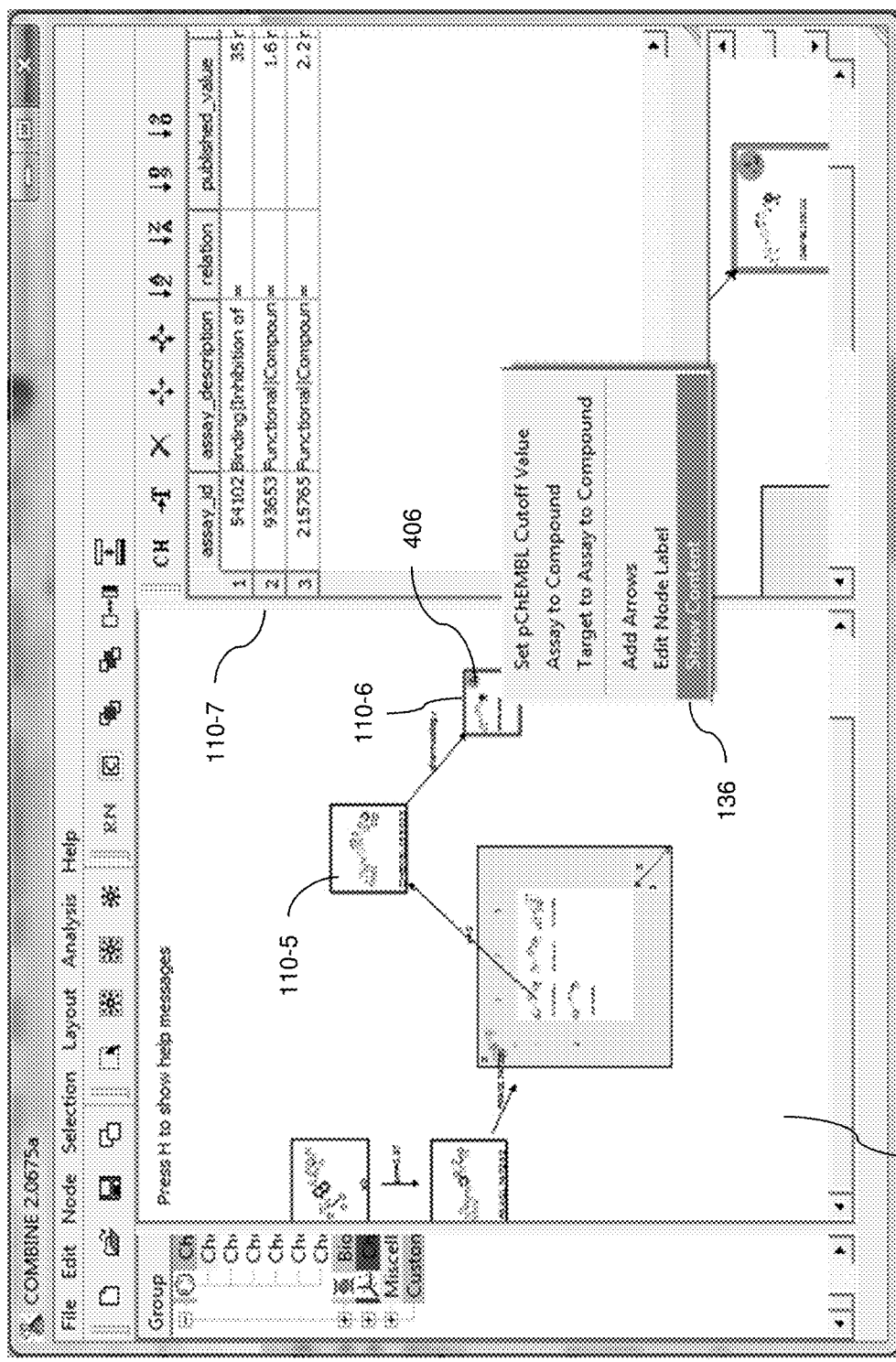

FIGS. 4C-4D are photographs of the workspace 20 illustrating the workflow from a chemical compound to pharmacological data, according to some exemplary embodiments of the present invention.

As illustrated in FIG. 4C, in some examples, when a user presses a right mouse button on a container 110-5 displaying a chemical compound, the interaction system 10 displays a selection menu 130 that presents a plurality of optional actions that are preassigned to the container type of container 110-5. For example, choosing "ChEMBL" from the menu 130 and then "Compound Pharmacology" from the submenu 132 may prompt the interaction system 10 to instantiate container 110-6, which displays a blue circle 406 representing the pharmacological data associated with a human protein. As illustrated in FIG. 4D, further right-clicking the container 110-6 may prompt the interaction system 10 to display a menu 136 that presents a number of optional actions that are preassigned to the container type of container 110-6. Selecting "Show Content" from the menu 136 may prompt the interaction system 10 to instantiate container 110-7, which invoked a function to output and display the data table content of container 110-6, which contains both human protein data and other data, such as in vitro data. Double-clicking the "pubmed_id" parameter found in a table cell of container 110-7 (not shown) may prompt the system 10 to invoke a preassigned function to search for and display the associated journal abstract.

While in the above interactions of the user with the interactive network 100 have been described with reference to clicks, double-clicks, or right-clicks, embodiments of the present invention are not limited thereto. For example, the user interaction may be a touch event captured by a touch screen, may be a touchless gesture (e.g., a hand or facial gesture) captured by a touchless screen equipped with proximity sensors, and/or the like.

FIG. 5 is a block diagram illustrating various components of the interaction system 10, according to some exemplary embodiments of the present invention.

Referring to FIG. 5, according to some embodiments, the interaction system 10 includes an interaction server 200 that performs the processes described above with respect to FIGS. 1 to 4D, such as keeping track of and dynamically updating (e.g., in real-time) the presence, location, and properties of the interactive containers 110 and links 120 (e.g., by updating the contextual information). The interaction server 200 may store any saved interactive network 100 and associated contextual data in the memory 201, which may be a non-volatile memory such as flash memory, magnetic memory, optical memory, and/or the like.

When a user interacts with an interactive network 100, the interaction server 200 is in communication with (e.g., launches/executes, provides input data to, and retrieves output data from) a plurality of applications 202-1 to 202-N (where N is a natural number greater than 1) associated with the containers 110 of the interactive network 100. Each of the applications 202-1 to 202-N may be local to (e.g., at the same device as) the interactive server 200 or may be remotely stored (e.g., stored at a device external to the interactive server 200). For example, one or more of the applications 202-1 to 202-*n* may be stored on cloud servers that are in communication with the interaction server 200.

According to some embodiments, the interaction system 10 supports multi-user operations in which a plurality of users 204-1 to 204-M (where M is a natural number greater than 1) can access the interaction server 200. For example, multiple users may be able to work on the same interactive network 100 at the same time. In some embodiments, the interaction server 200 handles role-based access control to allow/limit the ability of a user 204 to perform a specific operation or to view/edit an interactive network 100 generated by other users.

Each user 204 may operate an electronic device (e.g., a terminal) 206 for accessing the interaction server 200, which may be in electronic communication with the interaction system 10 over a communication network 208 (e.g., a local area network or a wide area network), which may include a telephone connection, a satellite connection, a cable connection, radio frequency communication, and/or any suitable wired or wireless data communication mechanism. The electronic device 206 may take the form of a personal computer (PC), a hand-held personal computer (HPC), a television and set-top-box combination, a personal digital assistant (PDA), a tablet or touch screen computer system, a telephone, a cellular telephone, a smartphone, or any other suitable electronics device.

While FIG. 5 illustrates embodiments in which the electronic device 206 operated by the user is separate from the interaction system 10, embodiments of the present invention are not limited thereto. For example, the interaction server 200 and the electronic device 206 may be integrated into the same electronic device (e.g., a personal computer).

Figure 6:
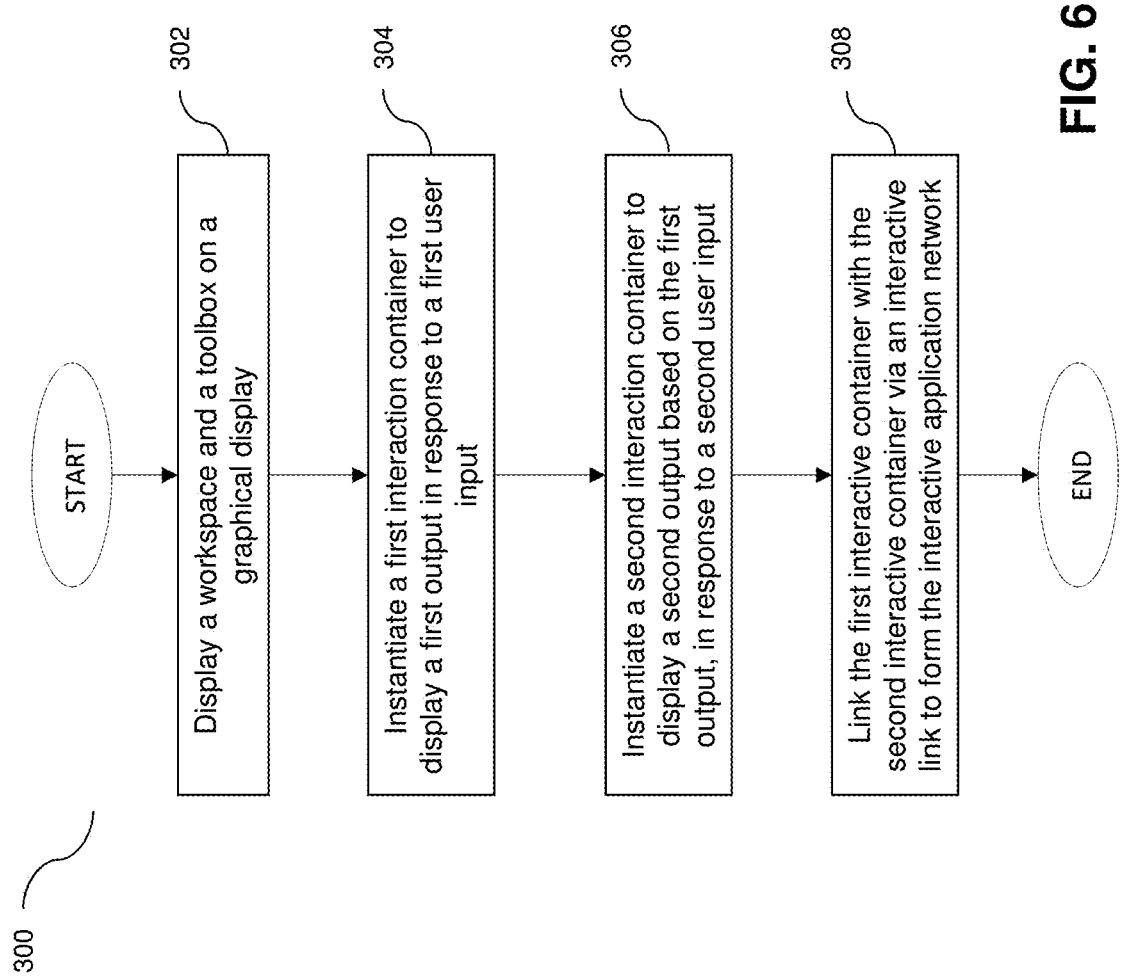
FIG. 6 is a flow diagram illustrating a process of creating an interactive application network, according to some exemplary embodiments of the present invention.

FIG. 6 is a flow diagram illustrating a process 300 of creating an interactive application network 100, according to some exemplary embodiments of the present invention.

In operation 302, the interaction server 200 displays a workspace 20 and a toolbox on a display screen of, for example, the electronic device 206.

In operation 304, the interaction server 200 instantiates a first interaction container 110 to display a first output in response to a first user input. In so doing, the interaction server 200 may generate the first interactive container 110 in response to the first user input, and execute a first application associated with the first interactive container 110 to generate the first output for display. The interaction server 200 may then display the first output in a viewport 114 of the first interactive container 110. Here, the first user input may be a user selection of a task from the toolbox or an import of data (e.g., through copy and pasting) from an external application that is compatible with the interaction system 10.

In operation 306, the interaction server 200 instantiates a second interaction container 110 to display a second output based on the first output, in response to a second user input. The second user input may be a user interaction with the first interactive container 110. The interaction includes, but is not limited to selecting a portion of the first container 110, selecting data displayed on the first container, invoking a menu option associated with the first container, and/or the like. In instantiating the second container 110, the interaction server 200 may generate the second interactive container 110 in response to the second user input, and extract data from the first interactive container 110 based on the second user input. For example, if a user double-clicks on a compound displayed by the first container 110, the extracted data may be associated with the compound. The extracted data may be supplied to the second application associated with the second interactive container 110 when executing it to generate the second output for display. In other words, the output of the second container 110 may be derived from data extracted from the first container 110. The interaction server 200 may then display the second output in a viewport 114 of the second interactive container 110.

In some examples, the second user input may be a user interaction with the first output of the first interactive container 110 (e.g., may be a double-click on a or compound or a bond in a compound displayed in the viewport 114 of the first container 110) or may be a selection of a task or an application from a selection menu associated with the first interactive container or an element displayed therein. The selection menu may be displayed when the user right-clicks on the first container 110, or on an element displayed therein.

In operation 308, the interaction server 200 links the first interactive container 110 with the second interactive container 110 via an interactive link 120 to form the interactive application network 100. In so doing, the interaction server 200 may generate contextual data identifying the first interactive container 110 as a parent of the second interactive container 110, and further identifying the second interactive container 110 as a child of the first interactive container 110. The interaction server 200 may also display the interactive link 120 on the workspace as a pointer or an arrow that points from the first interactive container 110 to the second interactive container 110. In some examples, the interactive link 120 may point from an element displayed by the first container 110 to the second interactive container 110 or to another element displayed in the second interactive container.

The contextual data maintained by the interaction server 200 (e.g., at the memory 201), may also include the identifier, position, and size (e.g., zoom level) of every container 110 and link 120 in the interactive network 100 along with any associated annotations.

According to some examples, the first and second applications may include one or more of a word processor, a web browser, a spreadsheet, a communication software, an image/video viewer, an image/video editor, a 3D visualizer, and/or the like.

According to some embodiments, the interaction server 200 is configured to suspend an application associated with an inactive container from among the first and second interactive containers 110, and maintain active an application associated with an active container from among the first and second interactive containers 110. In so doing, the interaction server 200 may display an image, in a viewport 114 of the inactive container 110, that corresponds to a last live output of the now inactive container, and may display a live output in a viewport 114 of the active container.

Accordingly, the interactive network 100 is capable of tracking (e.g., recording) and visually displaying a workflow (e.g., a sequence of actions and tasks) of a user. The interaction system 10 may improve data organization, data sharing, data analysis, and data visualization as compared to conventional approaches, and may allow users to visualize and share their work history. This may facilitate collaboration among users and lead to increased productivity and reduced cost and research time for researchers and research organizations.

As described herein, various applications and aspects of the present invention may be implemented in software, firmware, hardware, and combinations thereof. When implemented in software, the software may operate on a general purpose computing device such as a server, a desktop computer, a tablet computer, a smartphone, personal digital assistant, or an embedded system such as a computer system embedded in a device to create an Internet-of-things (IoT) device. Such a general purpose computer includes a general purpose processor and memory.

Each of the various servers or modules (collectively referred to as servers) in the afore-described figures may be a process or thread, running on one or more processors, in one or more computing devices 1500 (see, e.g., FIG. 7A, FIG. 7B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g., an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers, and other modules.

The functions of the interaction server may be performed by a number of different servers that may be located on a same computing device on-site at the same physical location or may be distributed off-site (or in the cloud) in geographically different locations, e.g., in a remote data center, and connected to one another via a network such as the Internet. In addition, some of the servers may be located in a computing device on-site while others may be located in a computing device off-site, or servers providing redundant functionality may be provided both via on-site and off-site computing devices to provide greater fault tolerance. In some embodiments of the present invention, functionality provided by servers located on computing devices off-site may be accessed and provided over a virtual private network (VPN) as if such servers were on-site, or the functionality may be provided using a software as a service (SaaS) to provide functionality over the Internet using various protocols, such as by exchanging data using encoded in extensible markup language (XML) or JavaScript Object Notation (JSON).

Figure 7A:
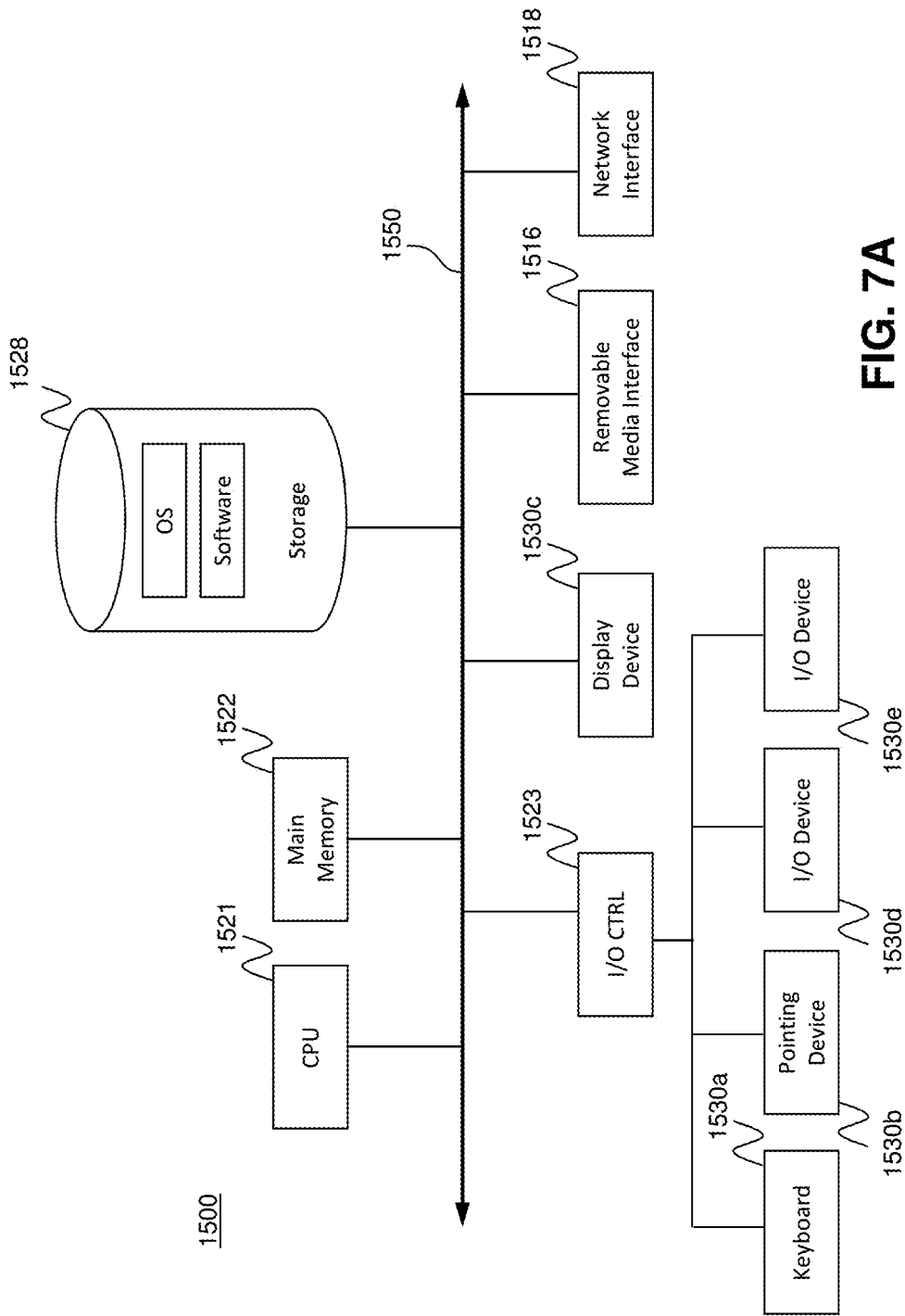
FIGS. 7A-7D are block diagrams of a computing device, according to some exemplary embodiments of the present invention.
Figure 7B:
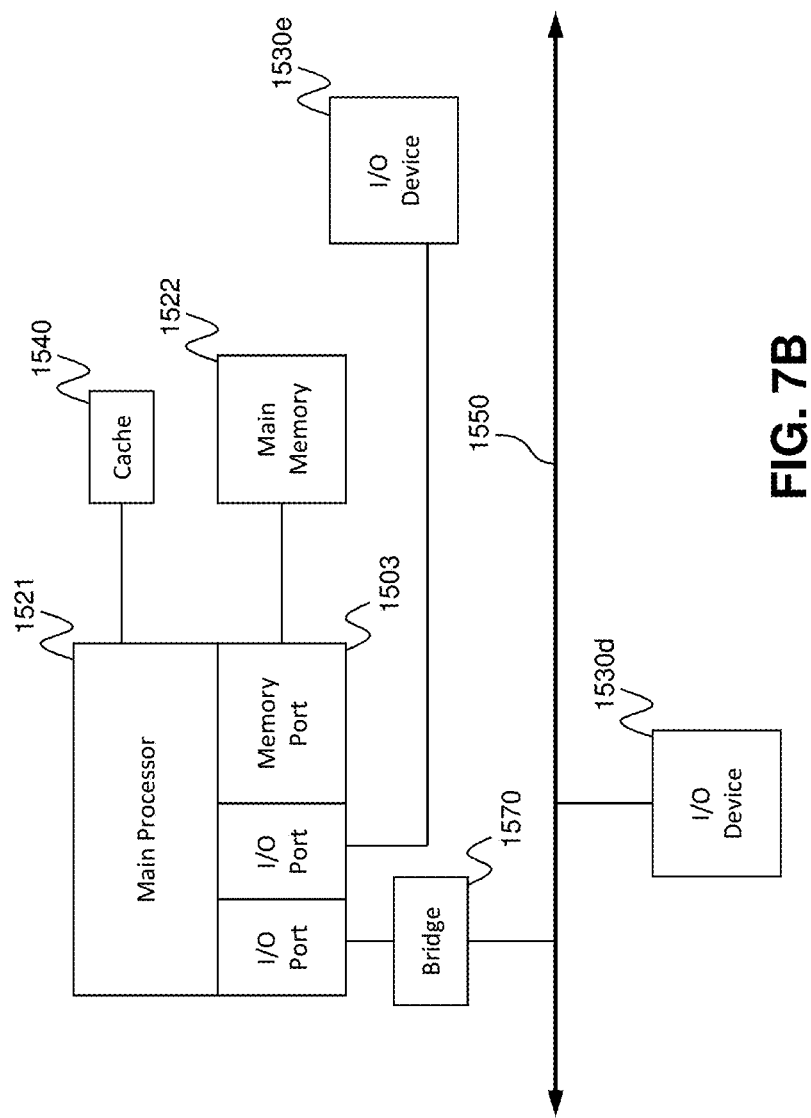

FIG. 7A and FIG. 7B depict block diagrams of a computing device 1500 as may be employed in exemplary embodiments of the present invention. Each computing device 1500 includes a central processing unit 1521 and a main memory unit 1522. As shown in FIG. 7A, the computing device 1500 may also include a storage device 1528, a removable media interface 1516, a network interface 1518, an input/output (I/O) controller 1523, one or more display devices 1530c, a keyboard 1530a and a pointing device 1530b, such as a mouse. The storage device 1528 may include, without limitation, storage for an operating system and software. As shown in FIG. 7B, each computing device 1500 may also include additional optional elements, such as a memory port 1503, a bridge 1570, one or more additional input/output devices 1530d, 1530e and a cache memory 1540 in communication with the central processing unit 1521. The input/output devices 1530a, 1530b, 1530d, and 1530e may collectively be referred to herein using reference numeral 1530.

The central processing unit 1521 is any logic circuitry that responds to and processes instructions fetched from the main memory unit 1522. It may be implemented, for example, in an integrated circuit, in the form of a microprocessor, microcontroller, or graphics processing unit (GPU), or in a field-programmable gate array (FPGA) or application-specific integrated circuit (ASIC). The main memory unit 1522 may be one or more memory chips capable of storing data and allowing any storage location to be directly accessed by the central processing unit 1521. As shown in FIG. 7A, the central processing unit 1521 communicates with the main memory 1522 via a system bus 1550. As shown in FIG. 7B, the central processing unit 1521 may also communicate directly with the main memory 1522 via a memory port 1503.

FIG. 7B depicts an embodiment in which the central processing unit 1521 communicates directly with cache memory 1540 via a secondary bus, sometimes referred to as a backside bus. In other embodiments, the central processing unit 1521 communicates with the cache memory 1540 using the system bus 1550. The cache memory 1540 typically has a faster response time than main memory 1522. As shown in FIG. 7A, the central processing unit 1521 communicates with various I/O devices 1530 via the local system bus 1550. Various buses may be used as the local system bus 1550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 1530c, the central processing unit 1521 may communicate with the display device 1530c through an Advanced Graphics Port (AGP). FIG. 7B depicts an embodiment of a computer 1500 in which the central processing unit 1521 communicates directly with I/O device 1530e. FIG. 7B also depicts an embodiment in which local busses and direct communication are mixed: the central processing unit 1521 communicates with I/O device 1530d using a local system bus 1550 while communicating with I/O device 1530e directly.

A wide variety of I/O devices 1530 may be present in the computing device 1500. Input devices include one or more keyboards 1530a, mice, trackpads, trackballs, microphones, and drawing tablets. Output devices include video display devices 1530c, speakers, and printers. An I/O controller 1523, as shown in FIG. 7A, may control the I/O devices. The I/O controller may control one or more I/O devices such as a keyboard 1530*a* and a pointing device 1530*b*, e.g., a mouse or optical pen.

Referring again to FIG. 7A, the computing device 1500 may support one or more removable media interfaces 1516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 1530 may be a bridge between the system bus 1550 and a removable media interface 1516.

The removable media interface 1516 may for example be used for installing software and programs. The computing device 1500 may further include a storage device 1528, such as one or more hard disk drives or hard disk drive arrays, for storing an operating system and other related software, and for storing application software programs. Optionally, a removable media interface 1516 may also be used as the storage device. For example, the operating system and the software may be run from a bootable medium, for example, a bootable CD.

In some embodiments, the computing device 1500 may include or be connected to multiple display devices 1530*c*, which each may be of the same or different type and/or form. As such, any of the I/O devices 1530 and/or the I/O controller 1523 may include any type and/or form of suitable hardware, software, or combination of hardware and software to support, enable or provide for the connection to, and use of, multiple display devices 1530*c* by the computing device 1500. For example, the computing device 1500 may include any type and/or form of video adapter, video card, driver, and/or library to interface, communicate, connect or otherwise use the display devices 1530*c*. In one embodiment, a video adapter may include multiple connectors to interface to multiple display devices 1530*c*. In other embodiments, the computing device 1500 may include multiple video adapters, with each video adapter connected to one or more of the display devices 1530*c*. In some embodiments, any portion of the operating system of the computing device 1500 may be configured for using multiple display devices 1530*c*. In other embodiments, one or more of the display devices 1530*c* may be provided by one or more other computing devices, connected, for example, to the computing device 1500 via a network. These embodiments may include any type of software designed and constructed to use the display device of another computing device as a second display device 1530*c* for the computing device 1500. One of ordinary skill in the art will recognize and appreciate the various ways and embodiments that a computing device 1500 may be configured to have multiple display devices 1530*c*.

A computing device 1500 of the sort depicted in FIG. 7A and FIG. 7B may operate under the control of an operating system, which controls scheduling of tasks and access to system resources. The computing device 1500 may be running any operating system, any embedded operating system, any real-time operating system, any open source operating system, any proprietary operating system, any operating systems for mobile computing devices, or any other operating system capable of running on the computing device and performing the operations described herein.

The computing device 1500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 1500 may have different processors, operating systems, and input devices consistent with the device.

In other embodiments the computing device 1500 is a mobile device, such as a Java-enabled cellular telephone or personal digital assistant (PDA), a smart phone, a digital audio player, or a portable media player. In some embodiments, the computing device 1500 includes a combination of devices, such as a mobile phone combined with a digital audio player or portable media player.

Figure 7D:
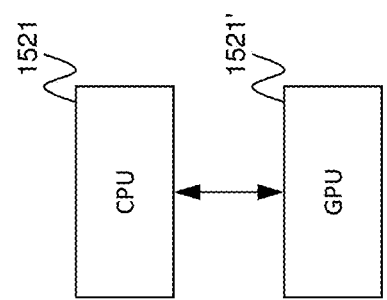
Figure 7C:
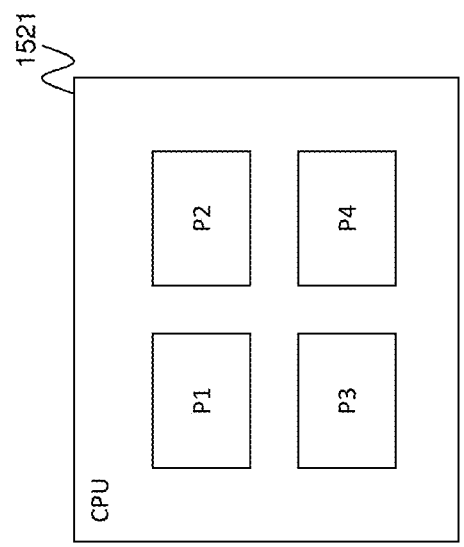

As shown in FIG. 7C, the central processing unit 1521 may include multiple processors P1, P2, P3, P4, and may provide functionality for simultaneous execution of instructions or for simultaneous execution of one instruction on more than one piece of data. In some embodiments, the computing device 1500 may include a parallel processor with one or more cores. In one of these embodiments, the computing device 1500 is a shared memory parallel device, with multiple processors and/or multiple processor cores, accessing all available memory as a single global address space. In another of these embodiments, the computing device 1500 is a distributed memory parallel device with multiple processors each accessing local memory only. In still another of these embodiments, the computing device 1500 has both some memory which is shared and some memory which may only be accessed by particular processors or subsets of processors. In still even another of these embodiments, the central processing unit 1521 includes a multicore microprocessor, which combines two or more independent processors into a single package, e.g., into a single integrated circuit (IC). In one exemplary embodiment, depicted in FIG. 7D, the computing device 1500 includes at least one central processing unit 1521 and at least one graphics processing unit 1521'.

In some embodiments, a central processing unit 1521 provides single instruction, multiple data (SIMD) functionality, e.g., execution of a single instruction simultaneously on multiple pieces of data. In other embodiments, several processors in the central processing unit 1521 may provide functionality for execution of multiple instructions simultaneously on multiple pieces of data (MIMD). In still other embodiments, the central processing unit 1521 may use any combination of SIMD and MIMD cores in a single device.

Figure 7E:
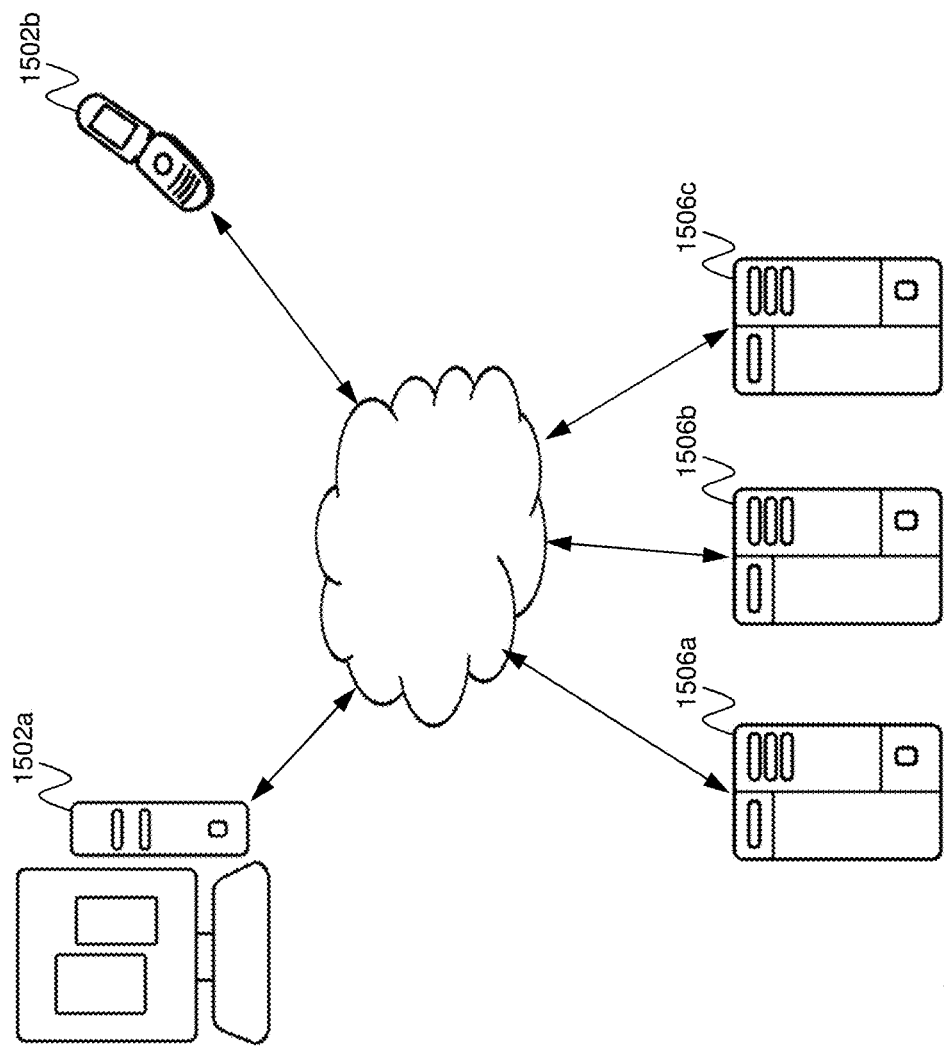
FIG. 7E is a block diagram of a network environment including several computing devices, according to some exemplary embodiments of the present invention.

A computing device may be one of a plurality of machines connected by a network, or it may include a plurality of machines so connected. FIG. 7E shows an exemplary network environment. The network environment includes one or more local machines 1502*a*, 1502*b* (also generally referred to as local machine(s) 1502, client(s) 1502, client node(s) 1502, client machine(s) 1502, client computer(s) 1502, client device(s) 1502, endpoint(s) 1502, or endpoint node(s) 1502) in communication with one or more remote machines 1506*a*, 1506*b*, 1506*c* (also generally referred to as server machine(s) 1506 or remote machine(s) 1506) via one or more networks 1504. In some embodiments, a local machine 1502 has the capacity to function as both a client node seeking access to resources provided by a server machine and as a server machine providing access to hosted resources for other clients 1502*a*, 1502*b*. Although only two clients 1502 and three server machines 1506 are illustrated in FIG. 7E, there may, in general, be an arbitrary number of each. The network 1504 may be a local-area network (LAN), e.g., a private network such as a company Intranet, a metropolitan area network (MAN), or a wide area network (WAN), such as the Internet, or another public network, or a combination thereof.

The computing device 1500 may include a network interface 1518 to interface to the network 1504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 1500 communicates with other computing devices 1500 via any type and/or form of gateway or tunneling protocol such as Secure Socket Layer (SSL) or Transport Layer Security (TLS). The network interface 1518 may include a built-in network adapter, such as a network interface card, suitable for interfacing the computing device 1500 to any type of network capable of communication and performing the operations described herein. An I/O device 1530 may be a bridge between the system bus 1550 and an external communication bus.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

The terminology used herein is for the purpose of describing particular embodiments and is not intended to be limiting of the inventive concept. As used herein, the singular forms "a" and "an" are intended to include the plural forms as well, unless the context clearly indicates otherwise. It will be further understood that the terms "include", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of", when preceding a list of elements, modify the entire list of elements and do not modify the individual elements of the list. Further, the use of "may" when describing embodiments of the inventive concept refers to "one or more embodiments of the inventive concept". Also, the term "exemplary" is intended to refer to an example or illustration.

As used herein, the terms "use", "using", and "used" may be considered synonymous with the terms "utilize", "utilizing", and "utilized", respectively.

While this invention has been described in detail with particular references to illustrative embodiments thereof, the embodiments described herein are not intended to be exhaustive or to limit the scope of the invention to the exact forms disclosed. For example, while some of the example embodiments described above relate to pharmacological research, embodiments of the present invention are not limited thereto, and the invention may apply to any other suitable field. Persons skilled in the art and technology to which this invention pertains will appreciate that alterations and changes in the described structures and methods of assembly and operation can be practiced without meaningfully departing from the principles, spirit, and scope of this invention, as set forth in the following claims and equivalents thereof.

What is claimed is:

1. A method for information analysis comprising:
receiving, by a processor, a first command;
generating, by the processor, a first container in response to the first command;
invoking, by the processor, a first application for generating a first display of data in the first container;
generating, by the processor, first contextual information associated with the first container;
storing, by the processor, the first contextual information in a data store;
detecting, by the processor, interaction with the first container;
in response to the interaction, applying, by the processor, a function in relation to the data displayed in the first container;
generating, by the processor, a second container in response to applying the function;
invoking, by the processor, a second application for generating a second display of data in the second container;
generating, by the processor, second contextual information associated with the second container;
updating the data store with the second contextual information; and
linking, by the processor, the first container to the second container via a graphical link.

2. The method of claim 1 further comprising:
tracking the first command and the interaction; and
depicting the first command and the interaction as a sequence of actions.

3. The method of claim 1 further comprising:
invoking, by the processor, a graphical user interface tool, wherein the graphical user interface tool includes a display area for displaying the first and second containers.

4. The method of claim 3, wherein the first command is provided in response to actuation of an option provided by the graphical user interface tool.

5. The method of claim 1, wherein the first or second application is at least one of a word processor, a web browser, a spreadsheet, a communication software, an image or video viewer, an image or video editor, or a 3D visualizer.

6. The method of claim 1, wherein the second application is different from the first application.

7. The method of claim 1, wherein the function is selected from a plurality of functions pre-assigned to a container type associated with the first container.

8. The method of claim 1, wherein the first or second contextual information includes identifier, position, or size of the first or second container, or information denoting relationship of the first and second containers.

9. The method of claim 1, wherein the link is for sharing data from the first container to the second container.

10. The method of claim 1, wherein the interaction with the first container includes selecting a portion of the data displayed in the first container.

11. A system for information analysis comprising:
processor; and
memory coupled to the processor, the memory storing instructions that, when executed by the processor, cause the processor to:
receive a first command;
generate a first container in response to the first command;
invoke a first application for generating a first display of data in the first container;

generate first contextual information associated with the first container;
store the first contextual information in a data store;
detect interaction with the first container;
in response to the interaction, apply a function in relation to the data displayed in the first container;
generate a second container in response to applying the function;
invoke a second application for generating a second display of data in the second container;
generate second contextual information associated with the second container;
update the data store with the second contextual information; and
link the first container to the second container via a graphical link.

12. The system of claim 11, wherein the instructions further cause the processor to:
track the first command and the interaction; and
depict the first command and the interaction as a sequence of actions.

13. The system of claim 11, wherein the instructions further cause the processor to:
invoke a graphical user interface tool, wherein the graphical user interface tool includes a display area for displaying the first and second containers.

14. The system of claim 13, wherein the first command is provided in response to actuation of an option provided by the graphical user interface tool.

15. The system of claim 11, wherein the first or second application is at least one of a word processor, a web browser, a spreadsheet, a communication software, an image or video viewer, an image or video editor, or a 3D visualizer.

16. The system of claim 11, wherein the second application is different from the first application.

17. The system of claim 11, wherein the function is selected from a plurality of functions pre-assigned to a container type associated with the first container.

18. The system of claim 11, wherein the first or second contextual information includes identifier, position, or size of the first or second container, or information denoting relationship of the first and second containers.

19. The system of claim 11, wherein the link is for sharing data from the first container to the second container.

20. The system of claim 11, wherein the instructions that cause the processor to interact with the first container include instructions that cause the processor to select a portion of the data displayed in the first container.

* * * * *